(12) United States Patent
Li et al.

(10) Patent No.: US 11,019,018 B2
(45) Date of Patent: May 25, 2021

(54) ARTIFICIAL INTELLIGENT SYSTEMS AND METHODS FOR PRESENTING A PROMPTING MESSAGE ON A MOBILE DEVICE

(71) Applicant: BEIJING DIDI INFINITY TECHNOLOGY AND DEVELOPMENT CO., LTD., Beijing (CN)

(72) Inventors: Xinrui Li, Beijing (CN); He Gu, Beijing (CN); Yang Su, Beijing (CN); Haibin Gao, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/729,271

(22) Filed: Dec. 27, 2019

(65) Prior Publication Data
US 2020/0169523 A1 May 28, 2020

Related U.S. Application Data

(63) Continuation of application No. PCT/CN2018/090543, filed on Jun. 11, 2018.

(30) Foreign Application Priority Data

Jun. 28, 2017 (CN) .......................... 201710511712.3
Sep. 15, 2017 (CN) .......................... 201710840389.4

(51) Int. Cl.
*H04L 29/08* (2006.01)
*H04L 12/58* (2006.01)
(Continued)

(52) U.S. Cl.
CPC .............. *H04L 51/24* (2013.01); *H04L 51/04* (2013.01); *H04L 51/14* (2013.01); *H04L 51/38* (2013.01); *H04L 65/1059* (2013.01); *H04W 4/12* (2013.01)

(58) Field of Classification Search
CPC ................................. H04L 51/24; H04L 51/04
See application file for complete search history.

(56) References Cited

U.S. PATENT DOCUMENTS

| | | | |
|---|---|---|---|
| 2013/0132246 | A1 | 5/2013 | Amin et al. |
| 2014/0011522 | A1 | 1/2014 | Lin et al. |

(Continued)

FOREIGN PATENT DOCUMENTS

| | | | |
|---|---|---|---|
| CN | 100456787 C | 1/2009 | |
| CN | 106228383 A | 12/2016 | |

(Continued)

OTHER PUBLICATIONS

Extended European Search Report in European Application No. 18824266.3 dated Mar. 24, 2020, 8 pages.

(Continued)

*Primary Examiner* — Adnan M Mirza
(74) *Attorney, Agent, or Firm* — Metis IP LLC

(57) ABSTRACT

Systems and methods for presenting a prompting message on a user interface of an online to offline service application in a user terminal are provided. A method includes: obtaining, from a user terminal, a service request for a first service type, wherein the service request includes a location of the user terminal; determining a first supply-demand ratio of the first service type based on the location of the user terminal; determining whether the first supply-demand ratio is greater than a first ratio threshold; and in response to determining that the first supply-demand ratio is not greater than the first ratio threshold, sending, to the user terminal, a first bubble (Continued)

prompting message presented on a user interface of the user terminal, wherein the first bubble prompting message includes a second service type and a response time of the second service type.

20 Claims, 16 Drawing Sheets

(51) Int. Cl.
*H04L 29/06* (2006.01)
*H04W 4/12* (2009.01)

(56) References Cited

U.S. PATENT DOCUMENTS

2014/0279011 A1 9/2014 McMullen et al.
2018/0101877 A1 4/2018 Song et al.

FOREIGN PATENT DOCUMENTS

JP 2003317191 A 11/2003
WO 2014074407 A1 5/2014
WO 2016112318 A1 7/2016

OTHER PUBLICATIONS

First Office Action in Chinese Application No. 201710511712.3 dated Apr. 9, 2020, 16 pages.
First Office Action in Chinese Application No. 201710840389.4 dated Apr. 8, 2020, 21 pages.
International Search Report in PCT/CN2018/090543 dated Aug. 29, 2018, 4 pages.
Written Opinion in PCT/CN2018/090543 dated Aug. 29, 2018, 4 pages.
Decision to Grant a Patent in Japanese Application No. 2019-571744 dated Mar. 30, 2021, 4 pages.

800

Obtaining, from a user terminal, a first travel order, wherein the first travel order includes a target service type and a first sending time of the first travel order ~ 810

Determining a queue-number and a waiting time of the first travel order based on the first sending time and at least one second sending time of at least one second travel order in an unallocated order queue of a target service type ~ 820

Sending, to the user terminal, a second bubble prompting message presented on a user interface of the user terminal, wherein the second bubble prompting message includes the queue-number and the waiting time of the first travel order ~ 830

```
┌─────────────────────────────────────────┐
│ Obtaining, from a user terminal, a first travel order,
│ wherein the first travel order includes a target service
│ type and is triggered by a user on the user interface of
│ the online to offline service application in the user      │ ∿ 1510
│ terminal                                                    │
└─────────────────────────────────────────┘
                      │
                      ▼
┌─────────────────────────────────────────┐
│ In response to determining that the first travel order
│ fails to be allocated to a vehicle, sending, to the user    │ ∿ 1520
│ terminal, a card prompting message presented on the
│ user interface of the user terminal, wherein the card
│ prompting message includes a recommended service
│ type and a response time of the recommended service
│ type                                                        │
└─────────────────────────────────────────┘
```

FIG. 15

ARTIFICIAL INTELLIGENT SYSTEMS AND METHODS FOR PRESENTING A PROMPTING MESSAGE ON A MOBILE DEVICE

CROSS-REFERENCE TO THE RELATED APPLICATIONS

This application is a continuation of International Application No. PCT/CN 2018/090543, filed on Jun. 11, 2018, which claims priority to Chinese Patent Application No. 201710511712.3, filed on Jun. 28, 2017, and Chinese Patent Application No. 201710840389.4, filed on Sep. 15, 2017, the contents of which are hereby incorporated by reference.

TECHNICAL FIELD

The present disclosure generally relates to a technical field of Internet, and more particularly, systems and methods for presenting a prompting message on a mobile device.

BACKGROUND

In modern society, online to offline service applications are becoming increasingly widespread. A user may send out an order for requesting an online to offline service via an application installed in a user mobile terminal of the user. With the application, the user may communicate with a service provider, which improves service efficiency. On a user interface of the application, the application often displays information relating to the service for the user. A problem with the exiting technology is that the displayed information for the user cannot meet the user's demand. Accordingly, it is desirable to provide systems and methods for presenting a prompting message on a mobile device during an online to offline service.

SUMMARY

An aspect of the present disclosure introduces a system configured to present a prompting message on a user interface of an online to offline service application in a user terminal. The system may include: at least one storage medium including a set of instructions for presenting a prompting message on a user interface of an online to offline service application in a user terminal; and at least one processor in communication with the storage medium, wherein when executing the set of instructions. The at least one processor may be directed to: obtain, from a user terminal, a service request for a first service type, wherein the service request includes a location of the user terminal; determine a first supply-demand ratio of the first service type based on the location of the user terminal; determine whether the first supply-demand ratio is greater than a first ratio threshold; and in response to determining that the first supply-demand ratio is not greater than the first ratio threshold, send, to the user terminal, a first bubble prompting message presented on a user interface of the user terminal, wherein the first bubble prompting message includes a second service type and a response time of the second service type.

In some embodiments, the first bubble prompting message may further include a link to a user interface displaying the second service type, or a view of the first supply-demand ratio of the first service type.

In some embodiments, the second service type may have a greatest supply-demand ratio among a plurality of service types associated with the location of the user terminal.

In some embodiments, obtain, from the user terminal, a first travel order, wherein the first travel order includes a target service type and a first sending time of the first travel order; obtain at least one second travel order in an unallocated order queue of the target service type, each second travel order includes a second sending time of the second travel order; determine a queue-number and a waiting time of the first travel order based on the first sending time and the at least one second sending time; and send, to the user terminal, a second bubble prompting message presented on the user interface of the user terminal, wherein the second bubble prompting message includes the queue-number and the waiting time of the first travel order.

In some embodiments, the at least one processor may be further directed to: determine whether the waiting time of the first travel order is less than a time threshold; and in response to determining that the waiting time of the first travel order is not less than the time threshold, send, to the user terminal, the first bubble prompting message presented on the user interface of the user terminal.

In some embodiments, the at least one processor may be further directed to: allocate a vehicle to the user terminal based on the first travel order; and send, to the user terminal, a third bubble prompting message presented on the user interface of the user terminal, wherein the third bubble prompting message includes information relating to the allocated vehicle.

In some embodiments, the third bubble prompting message may include at least one of: a color of the allocated vehicle, a plate number of the allocated vehicle, or a vehicle type of the allocated vehicle.

In some embodiments, the at least one processor may be further directed to: obtain, from the user terminal, a first travel order, wherein the first travel order includes a target service type and a start location, and is triggered by a user on the user interface of the online to offline service application in the user terminal; determine that the first travel order fails to be allocated to a vehicle; and send, to the user terminal, a card prompting message presented on the user interface of the user terminal, wherein the card prompting message includes a recommended service type and a response time of the recommended service type.

In some embodiments, the card prompting message may further include at least one of: an option that triggers a recommended travel order for the recommended service type, an estimated fee of the recommended travel order for the recommended service type, or a fee difference between an estimated fee of the recommended travel order for the recommended service type and the estimated fee of the first travel order for the target service type.

In some embodiments, the first travel order may include a start location, and to determine that the first travel order fails to be allocated to a vehicle, the at least one processor may be further directed to: determine a second supply-demand ratio of the target service type based on the start location; determine whether the second supply-demand ratio is greater than a second ratio threshold; and in response to determining that the second supply-demand ratio is not greater than the second ratio threshold, determine that the first travel order fails to be allocated to a vehicle.

In some embodiments, to determine that the first travel order fails to be allocated to a vehicle, the at least one processor may be further directed to: obtain, from the user terminal, a cancel request for the first travel order; and determine that the first travel order fails to be allocated to a vehicle.

In some embodiments, the first travel order may include at least one of: a start time, a start location, a destination, or historical traveling information of the user terminal.

In some embodiments, the at least one processor may be further directed to: determine the recommended service type that prompted to the user terminal based on the first travel order.

According to another aspect of the present disclosure, a method for presenting a prompting message on a user interface of an online to offline service application in a user terminal may include: obtaining, from a user terminal, a service request for a first service type, wherein the service request includes a location of the user terminal; determining a first supply-demand ratio of the first service type based on the location of the user terminal; determining whether the first supply-demand ratio is greater than a first ratio threshold; and in response to determining that the first supply-demand ratio is not greater than the first ratio threshold, sending, to the user terminal, a first bubble prompting message presented on a user interface of the user terminal, wherein the first bubble prompting message includes a second service type and a response time of the second service type.

In some embodiments, the first bubble prompting message may further include a link to a user interface displaying the second service type, or a view of the first supply-demand ratio of the first service type.

In some embodiments, the second service type may have a greatest supply-demand ratio among a plurality of service types associated with the location of the user terminal.

In some embodiments, the method may further include: obtaining, from the user terminal, a first travel order, wherein the first travel order includes a target service type and a first sending time of the first travel order; obtaining at least one second travel order in an unallocated order queue of the target service type, each second travel order includes a second sending time of the second travel order; determining a queue-number and a waiting time of the first travel order based on the first sending time and the at least one second sending time; and sending, to the user terminal, a second bubble prompting message presented on the user interface of the user terminal, wherein the second bubble prompting message includes the queue-number and the waiting time of the first travel order.

In some embodiments, the method may further include: determining whether the waiting time of the first travel order is less than a time threshold; and in response to determining that the waiting time of the first travel order is not less than the time threshold, sending, to the user terminal, the first bubble prompting message presented on the user interface of the user terminal.

In some embodiments, the method may further include: allocating a vehicle to the user terminal based on the first travel order; and sending, to the user terminal, a third bubble prompting message presented on the user interface of the user terminal, wherein the third bubble prompting message includes information relating to the allocated vehicle.

In some embodiments, the third bubble prompting message may include at least one of: a color of the allocated vehicle, a plate number of the allocated vehicle, or a vehicle type of the allocated vehicle.

In some embodiments, the method may further include: obtaining, from the user terminal, a first travel order, wherein the first travel order includes a target service type and a start location, and is triggered by a user on the user interface of the online to offline service application in the user terminal; determining that the first travel order fails to be allocated to a vehicle; and sending, to the user terminal, a card prompting message presented on the user interface of the user terminal, wherein the card prompting message includes a recommended service type and a response time of the recommended service type.

In some embodiments, the card prompting message may further include at least one of: an option that triggers a recommended travel order for the recommended service type, an estimated fee of the recommended travel order for the recommended service type, or a fee difference between an estimated fee of the recommended travel order for the recommended service type and the estimated fee of the first travel order for the target service type.

In some embodiments, the first travel order may include a start location, and the determining that the first travel order fails to be allocated to a vehicle may include: determining a second supply-demand ratio of the target service type based on the start location; determining whether the second supply-demand ratio is greater than a second ratio threshold; and in response to determining that the second supply-demand ratio is not greater than the second ratio threshold, determining that the first travel order fails to be allocated to a vehicle.

In some embodiments, the determining that the first travel order fails to be allocated to a vehicle may include: obtaining, from the user terminal, a cancel request for the first travel order; and determining that the first travel order fails to be allocated to a vehicle.

In some embodiments, the first travel order may include at least one of: a start time, a start location, a destination, or historical traveling information of the user terminal.

In some embodiments, the method may further include: determining the recommended service type that prompted to the user terminal based on the first travel order.

According to still another aspect of the present disclosure, a non-transitory computer readable medium comprising at least one set of instructions for presenting a prompting message on a user interface of an online to offline service application in a user terminal, wherein when executed by at least one processor of a computer device, the at least one set of instructions may direct the at least one processor to: obtain, from a user terminal, a service request for a first service type, wherein the service request includes a location of the user terminal; determine a first supply-demand ratio of the first service type based on the location of the user terminal; determine whether the first supply-demand ratio is greater than a first ratio threshold; and in response to determining that the first supply-demand ratio is not greater than the first ratio threshold, send, to the user terminal, a first bubble prompting message presented on a user interface of the user terminal, wherein the first bubble prompting message includes a second service type and a response time of the second service type.

According to still another aspect of the present disclosure, a system configured to present a prompting message on a user interface of an online to offline service application in a user terminal, may include: a receiving module configured to obtain, from a user terminal, a service request for a first service type, wherein the service request includes a location of the user terminal; a determining module configured to determine a first supply-demand ratio of the first service type based on the location of the user terminal and determine whether the first supply-demand ratio is greater than a first ratio threshold; and a pushing module configured to in response to determining that the first supply-demand ratio is not greater than the first ratio threshold, send, to the user terminal, a first bubble prompting message presented on a user interface of the user terminal, wherein the first bubble prompting message includes a second service type and a response time of the second service type.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is a flowchart illustrating an exemplary process for presenting a second bubble prompting message according to some embodiments of the present disclosure;

FIG. 15 is a flowchart illustrating an exemplary process for presenting a third bubble prompting message according to some embodiments of the present disclosure;

DETAILED DESCRIPTION

Figure 1:
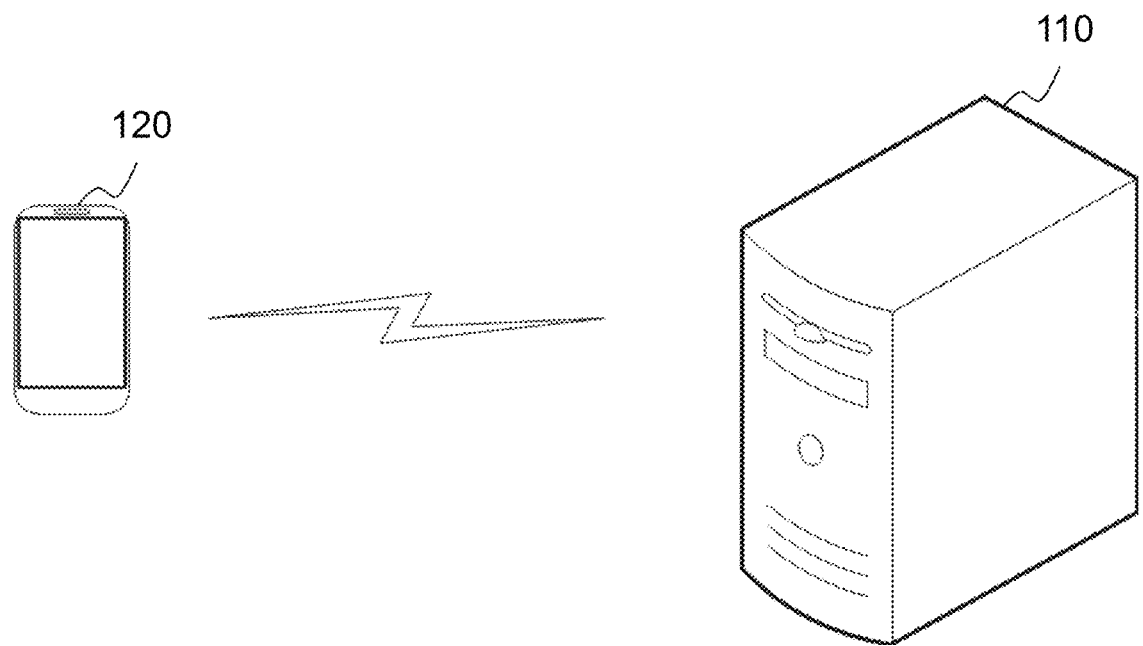
FIG. 1 is a schematic diagram illustrating an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for presenting a prompting message on a mobile device. To this end, the systems and methods may determine a supply-demand ratio of a service type that a user of the mobile device requests, and analyze the supply-demand ratio to determine whether to recommend another service type to the user. The recommended service type relating information thereof may be in a format of a bubble prompting message displayed on a user interface of the mobile device. The systems and methods may also determine whether the user fails to be allocated to a service provider or not, and analyze the determination result to determine whether to recommend another service type to the user. The recommended service type and relating information thereof may be in a format of a card prompting message displayed on the user interface of the mobile device. The systems and methods thereof may provide more information relating to the service, and improve user experiences.

FIG. 1 is a schematic diagram of an exemplary online to offline service system 100 according to some embodiments of the present disclosure. For example, the online to offline service system 100 may be an online to offline service platform for transportation services such as car hailing, chauffeur services, delivery vehicles, carpool, bus service, driver hiring, shuttle services, and online navigation services. The online to offline service system 100 may be an online platform including a server 110 and a user terminal 120. In some embodiments, the system 100 may further include a storage device, a network, and a service provider terminal (not shown).

The server 110 may be configured to process information and/or data relating to a service request and/or a service order. For example, the server 110 may send a prompting message presented on a user interface of the user terminal in response to a service request and/or a service order. In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the user terminal 120, and/or the storage via the network. As another example, the server 110 may connect the user terminal 120, and/or the storage to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine (not shown). The processing engine may process information and/or data relating to the service request and/or the service order to perform one or more functions described in the present disclosure. For example, the processing engine may send a prompting message presented on a user interface of the user terminal in response to a service request and/or a service order. In some embodiments, the processing engine may include one or more processing engines (e.g., single-core processing engine(s) or multi-core processor(s)). Merely by way of example, the processing engine may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The user terminal 120 may be a mobile device used by a user to request for an online to offline service, such as car hailing. In some embodiments, the user terminal 120 may be a mobile device, a tablet computer, a laptop computer, a built-in device in a motor vehicle, a user equipment (UE), a mobile station (MS), a terminal, or the like, or any combination thereof. In some embodiments, the mobile device may be a wearable device, a smart mobile device, a virtual reality device, an augmented reality device, or the like, or any combination thereof. In some embodiments, the wearable device may be a smart bracelet, a smart footgear, a smart glass, a smart helmet, a smart watch, a smart clothing, a smart backpack, a smart accessory, or the like, or any combination thereof. In some embodiments, the smart mobile device may be a smartphone, a personal digital assistance (PDA), a gaming device, a navigation device, a point of sale (POS) device, or the like, or any combination thereof. In some embodiments, the virtual reality device and/or the augmented reality device may be a virtual reality helmet, a virtual reality glass, a virtual reality patch, an augmented reality helmet, an augmented reality glass, an augmented reality patch, or the like, or any combination thereof. For example, the virtual reality device and/or the augmented reality device may be a Google Glass™ a RiftCon™, a Fragments™, a Gear VR™, etc. In some embodiments, built-in device in the motor vehicle may be an onboard computer, an onboard television, etc.

In some embodiments, the user terminal 120 may be a device with positioning technology for locating the position of the user and/or the user terminal 120. The positioning technology used in the present disclosure may be a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure. In some embodiments, the user terminal 120 may further include at least one network port. The at least one network port may be configured to send information to and/or receive information from one or more components in the system 100 (e.g., the server 110, the storage) via the network. In some embodiments, the user terminal 120 may be implemented on a computing device 200 having one or more components illustrated in FIG. 2, or a mobile device 300 having one or more components illustrated in FIG. 3 in the present disclosure. In some embodiments, the user terminal 120 may include an application installed therein. The server 110 may be a server of a service that the application offers.

The storage device may store data and/or instructions. For example, the storage device may store data obtained from the user terminal 120. As another example, the storage device may store data and/or instructions that the server 110 may execute or use to perform exemplary methods described in the present disclosure. In some embodiments, the storage device may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, one or more components of the online to offline service system 100 (e.g., the server 110, the user terminal 120) may access the storage device. In some embodiments, one or more components of the online to offline service system 100 may read and/or modify information relating to users, and/or the public when one or more conditions are met. For example, the server 110 may read and/or modify one or more users' information after completing a service.

The network may facilitate exchange of information and/or data. In some embodiments, one or more components of the online to offline service system 100 (e.g., the server 110, the user terminal 120, and the storage) may transmit information and/or data to other component(s) in the online to offline service system 100 via the network. For example, the server 110 may receive a service request from the user terminal 120 via the network. In some embodiments, the network may be any type of wired or wireless network, or combination thereof. Merely by way of example, the network may be a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network may include one or more network access points. For example, the network may include wired or wireless network access points such as base stations and/or internet exchange points, through which one or more components of the online to offline service system 100 may be connected to the network to exchange data and/or information between them.

In some embodiments, one or more components of the online to offline service system 100 (e.g., the server 110, the user terminal 120, and the storage device) may communicate with each other in form of electronic and/or electromagnetic signals, through wired and/or wireless communication. In some embodiments, the system 100 may further include at least one information exchange port. The at least one exchange port may be configured to receive information and/or send information relating to the service request (e.g., in form of electronic signals and/or electromagnetic signals) between any electronic devices in the system 100. For example, the at least one information exchange port may receive a service request from the user terminal 120 through wireless communication between the server 110 and the user terminal 120. As another example, the at least one information exchange port may send electromagnetic signals including a prompting message to the user terminal 120 through wireless communication. In some embodiments, the at least one information exchange port may be one or more of an antenna, a network interface, a network port, or the like, or any combination thereof. For example, the at least one information exchange port may be a network port connected to the server 110 to send information thereto and/or receive information transmitted therefrom.

Figure 2:
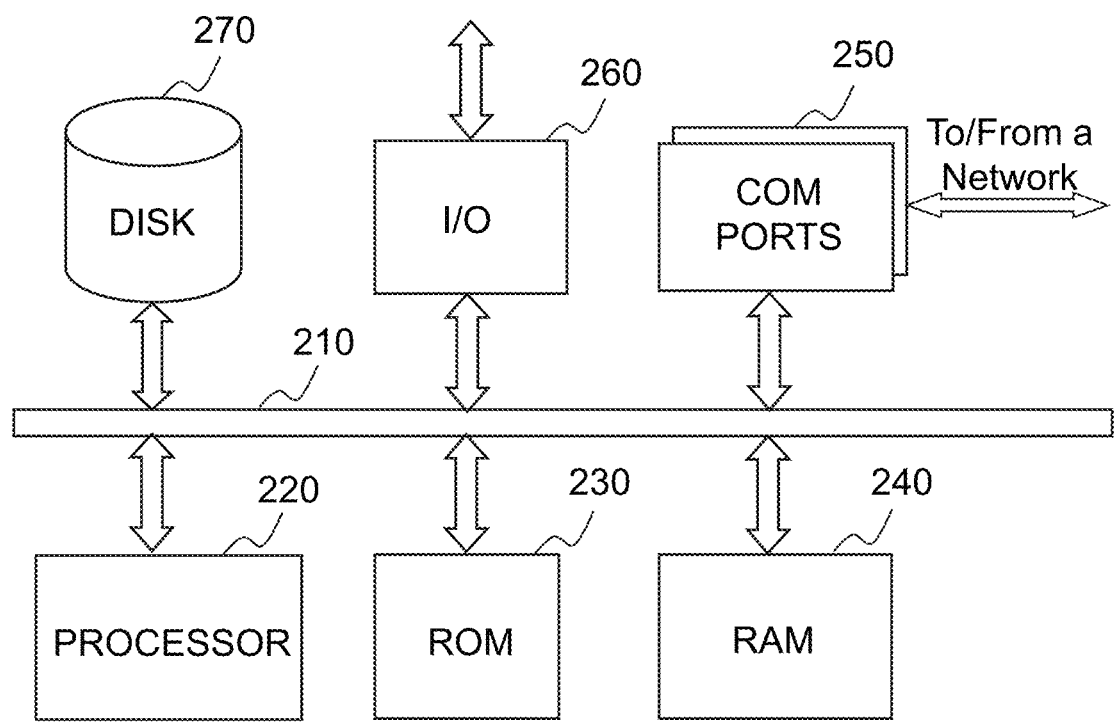
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the user terminal 130 may be implemented according to some embodiments of the present disclosure. For example, the processing engine 112 may be implemented on the computing device 200 and configured to perform functions of the server or the processing engine disclosed in this disclosure.

The computing device 200 may be used to implement the system 100 for the present disclosure. The computing device 200 may be used to implement any component of system 100 that performs one or more functions disclosed in the present disclosure. For example, the processing engine may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or information exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result (e.g., the literal destination) and a triggering code. In some embodiments, the trigger code may be in a format recognizable by an operation system (or an application installed therein) of an electronic device (e.g., the user terminal 130) in the AI system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., the literal destination) on an interface of the electronic device. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
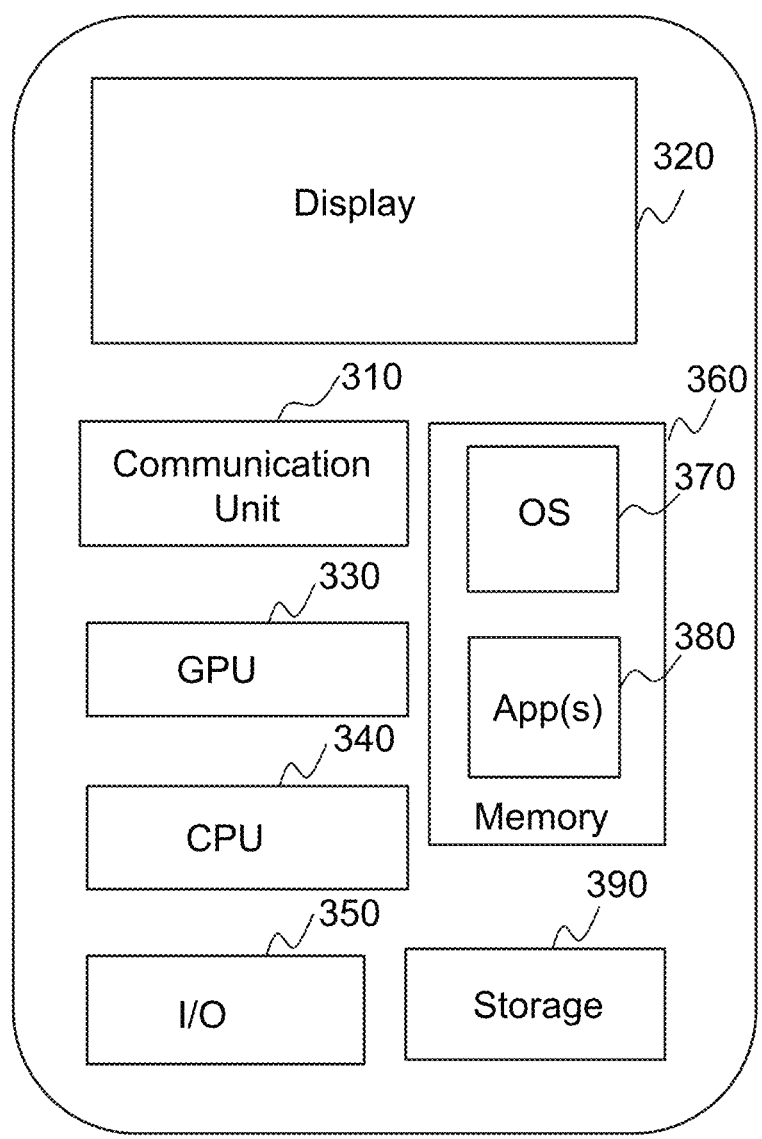
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the user terminal 120 may be implemented according to some embodiments of the present disclosure.

As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™ Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to a voice request for a service. User interactions with the information stream may be achieved via the I/O devices 350 and provided to the processing engine and/or other components of the system 100 via the network.

To implement various modules, units, and their functionalities described in the present disclosure, computer hardware platforms may be used as the hardware platform(s) for one or more of the elements described herein (e.g., the online to offline service system 100, and/or other components of the online to offline service system 100 described with respect to FIGS. 1-18). The hardware elements, operating systems and programming languages of such computers are conventional in nature, and it is presumed that those skilled in the art are adequately familiar therewith to adapt those technologies to provide a service in response to a voice request as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

One of ordinary skill in the art would understand that when an element of the online to offline service system 100 performs, the element may perform through electrical signals and/or electromagnetic signals. For example, when a server 110 processes a task, such as obtain a service request or a service order, the server 110 may operate logic circuits in its processor to process such task. When the server 110 receives the service request or the service order, a processor of the server 110 may generate electrical signals encoding the service request. The processor of the server 110 may then send the electrical signals to at least one information exchange port of a target system associated with the server 110. The server 110 communicates with the target system via a wired network, the at least one information exchange port may be physically connected to a cable, which may further transmit the electrical signals to an input port (e.g., an information exchange port) of the user terminal 120. If the server 110 communicates with the target system via a wireless network, the at least one information exchange port of the target system may be one or more antennas, which may convert the electrical signals to electromagnetic signals. Within an electronic device, such as the user terminal 120, and/or the server 110, when a processor thereof processes an instruction, sends out an instruction, and/or performs an action, the instruction and/or action is conducted via electrical signals. For example, when the processor retrieves or saves data from a storage medium (e.g., the storage device), it may send out electrical signals to a read/write device of the storage medium, which may read or write structured data in the storage medium. The structured data may be transmitted to the processor in the form of electrical signals via a bus of the electronic device. Here, an electrical signal may be one electrical signal, a series of electrical signals, and/or a plurality of discrete electrical signals.

Figure 4A:
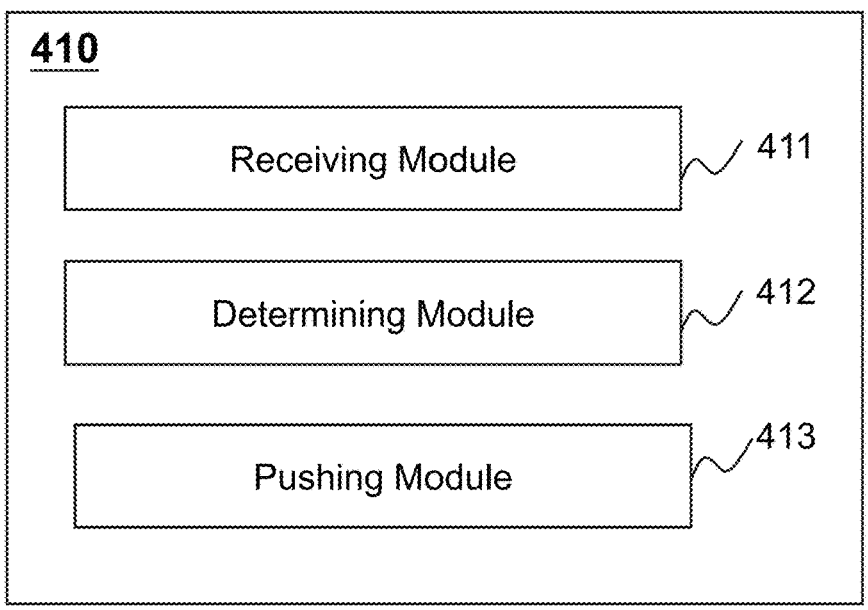
FIG. 4A is a block diagram illustrating an exemplary first system for presenting a prompting message according to some embodiments of the present disclosure.

FIG. 4A is a block diagram illustrating an exemplary first system for presenting a prompting message according to some embodiments of the present disclosure. As illustrated in FIG. 4A, the first system 410 may include a receiving module 411, a determining module 412, and a pushing module 413.

The receiving module 411 may be configured to obtain information relating to a service request and/or an order. For example, the receiving module 411 may obtain, from the user terminal 120, a service request for a first service type. In some embodiments, the service request includes a location of the user terminal, a start location, a destination, a request time, a start time, a service type, or the like, or any combination thereof. In some embodiments, the service request may be an intention for traveling using the first service type. As another example, the receiving module 411 may obtain, from the user terminal 120, a first travel order. In some embodiments, the first travel order may include a target service type, a first sending time of the first travel order, a start location, a destination, a start time, or the like, or any combination thereof.

The determining module 412 may be configured to determine results relating to the service request and/or the order. For example, the determining module 412 may determine a first supply-demand ratio of the first service type based on the location of the user terminal 120. In some embodiments, the first supply-demand ratio may be a ratio of a count of available vehicles (or available service providers) to a count of user terminals (or service requesters requesting for the target service type) in an area within a predetermined distance from the location of the user terminal 120 (or the start location of the user).

As another example, the determining module 412 may determine a queue-number and a waiting time of the first travel order based on the first sending time and at least one second sending time of at least one second travel order in an unallocated order queue of the target service type. In some embodiments, the at least one second travel order may include a plurality of travel orders sent by a plurality of other user terminals within an area of the user terminal 120. The at least one second travel order may include the same target service type with that of the first travel order.

The pushing module 413 may be configured to send information to the user terminal 120. For example, the pushing module 413 may send, to the user terminal 120, a first bubble prompting message presented on the user interface of the user terminal 120. In some embodiments, the first bubble prompting message may include response information of a second service type. The response information of the second service type may include a second service type and a response time of the second service type.

As another example, the pushing module 413 may send, to the user terminal 120, a second bubble prompting message presented on a user interface of the user terminal 120. In some embodiments, the second bubble prompting message may include the queue-number and the waiting time of the first travel order.

As still another example, the pushing module 413 may send, to the user terminal 120, a third bubble prompting message presented on a user interface of the user terminal 120. In some embodiments, the third bubble prompting message may include information relating to the allocated vehicle.

Figure 4B:
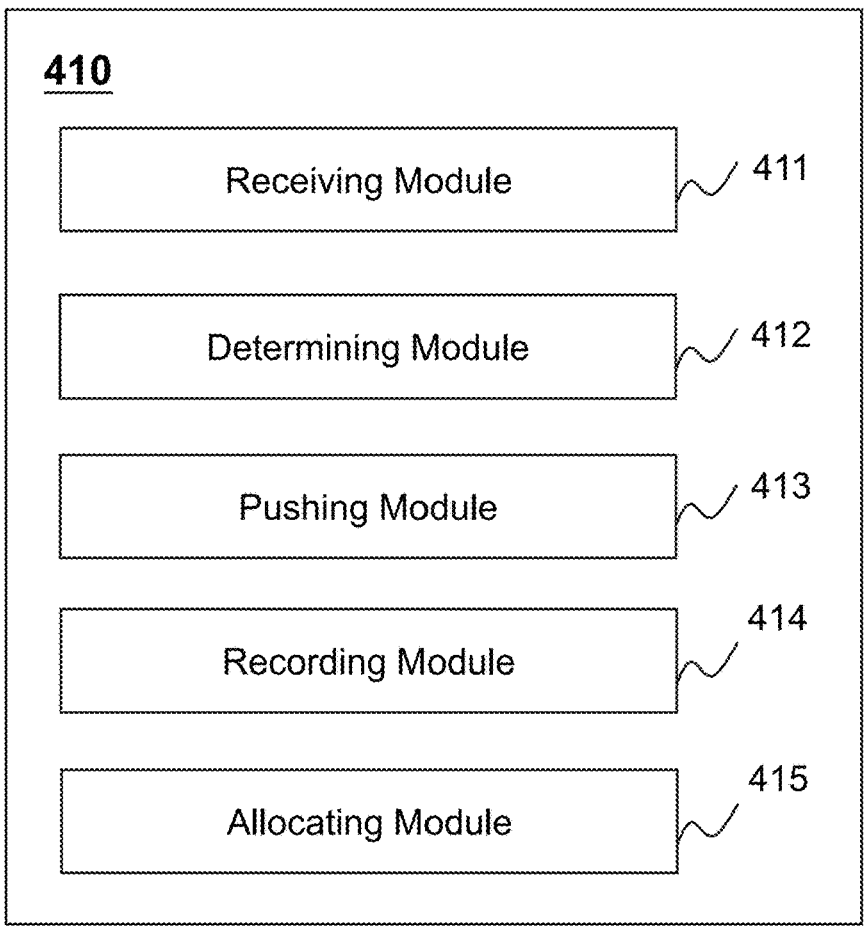
FIG. 4B is a block diagram illustrating an exemplary first system for presenting a prompting message according to some embodiments of the present disclosure.

FIG. 4B is a block diagram illustrating an exemplary first system for presenting a prompting message according to some embodiments of the present disclosure. As illustrated in FIG. 4B, the first system 410 may further include a recording module 414 and an allocating module 415.

The recording module 414 may be configured to record the waiting time of first travel order after receiving the first travel order sent by the user terminal 120. In some embodiments, the waiting time of the first travel order may be how long the server 110 will take to process the first order.

The allocating module 415 may be configured to allocate a vehicle to the user terminal 120 based on the first travel order. In some embodiments, the allocating module 415 may allocate a vehicle nearest to the user terminal 120, which is able to pick up the user and is the same service type in the first travel order, to the user terminal 120 based on the location of the user terminal 120 (or the start location of the user).

The modules in the first system 410 as illustrated in FIG. 4A and/or FIG. 4B may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the receiving module 411 and the pushing module 412 may be combined as a single module which may both obtain and send information. As another example, the processing engine 112 may include a storage module (not shown) used to store data and/or information of the model and/or the literal destination.

Figure 4C:
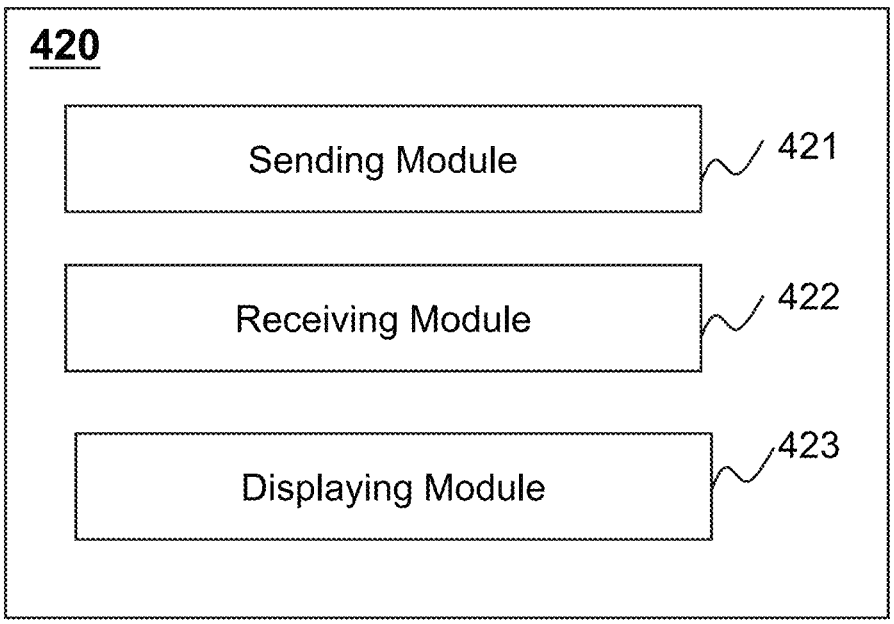
FIG. 4C is a block diagram illustrating an exemplary second system for presenting a prompting message according to some embodiments of the present disclosure.

FIG. 4C is a block diagram illustrating an exemplary second system for presenting a prompting message according to some embodiments of the present disclosure. As illustrated in FIG. 4B, the second system 420 may include a sending module 421, a receiving module 422, and a displaying module 423.

The sending module 421 may be configured to send information to the user terminal 120. For example, the sending module 421 may send, to the user terminal 120, a card prompting message presented on the user interface of the user terminal 120. In some embodiments, the card prompting message may include attribute information of a recommended service type. For example, the attribute information of the recommended service type may include a recommended service type, a logo of the recommended service type (e.g., a name or an image thereof), a response time of the recommended service type, or the like, or any combination thereof. The response time of the recommended service type may be a time that a vehicle of the recommended service type takes to arrive at the start location of the user, which is also refers to as a pick up time.

The receiving module 422 may be configured to obtain information relating to a service request and/or an order. For example, the receiving module 422 may obtain, from a user terminal 120, a first travel order. In some embodiments, the first travel order may be triggered by a user on a user interface of an online to offline service application in the user terminal 120. In some embodiments, the first travel order may include a target service type, a first sending time of the first travel order, a start location, a destination, a start time, a location of the user terminal, or the like, or any combination thereof.

The displaying module 423 may be configured to instruct the user terminal 120 to display the card prompting message on the user interface of the user terminal 120.

Figure 4D:
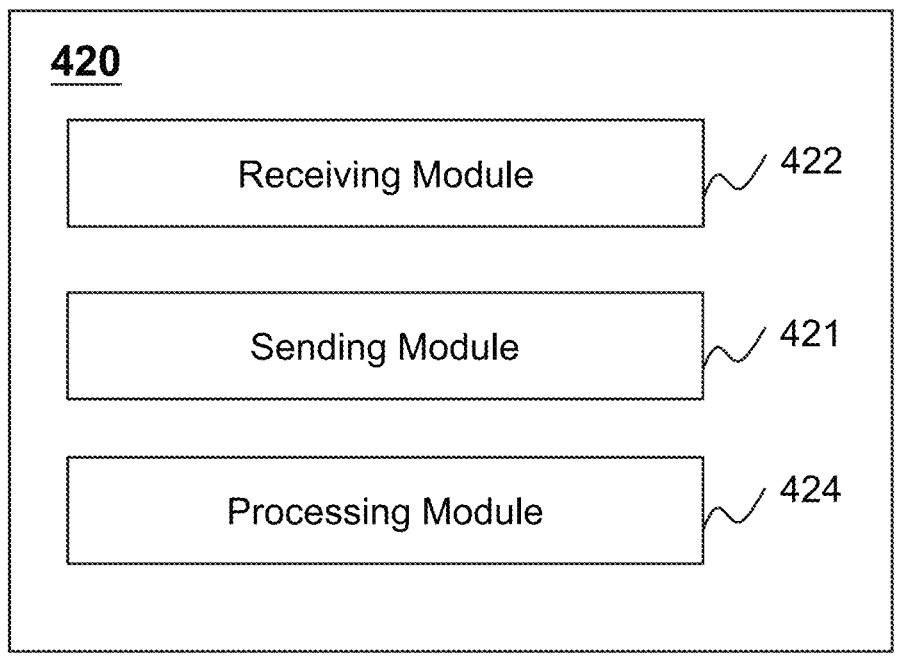
FIG. 4D is a block diagram illustrating an exemplary second system for presenting a prompting message according to some embodiments of the present disclosure.

FIG. 4D is a block diagram illustrating an exemplary second system for presenting a prompting message according to some embodiments of the present disclosure. As illustrated in FIG. 4D, the second system 420 may further include a processing module 424.

The processing module 424 may be configured to determine results relating the first travel order. For example, the processing module 424 may determine that the first travel order fails to be allocated to a vehicle based on a cancel request from the user terminal. As another example, the processing module 424 may determine a second supply-demand ratio of the target service type and whether the second supply-demand ratio is greater than a second ratio threshold. If the second supply-demand ratio is not greater than a second ratio threshold, the processing module 424 may determine that the first travel order is failed to be allocated to a vehicle. As still another example, the processing module 424 may determine the recommended service type.

The modules in the second system 420 as illustrated in FIG. 4C and/or FIG. 4D may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the receiving module 411 and the pushing module 412 may be combined as a single module which may both obtain and send information. As still another example, the processing engine 112 may include a storage module (not shown) used to store data and/or information of the model and/or the literal destination.

Figure 5:
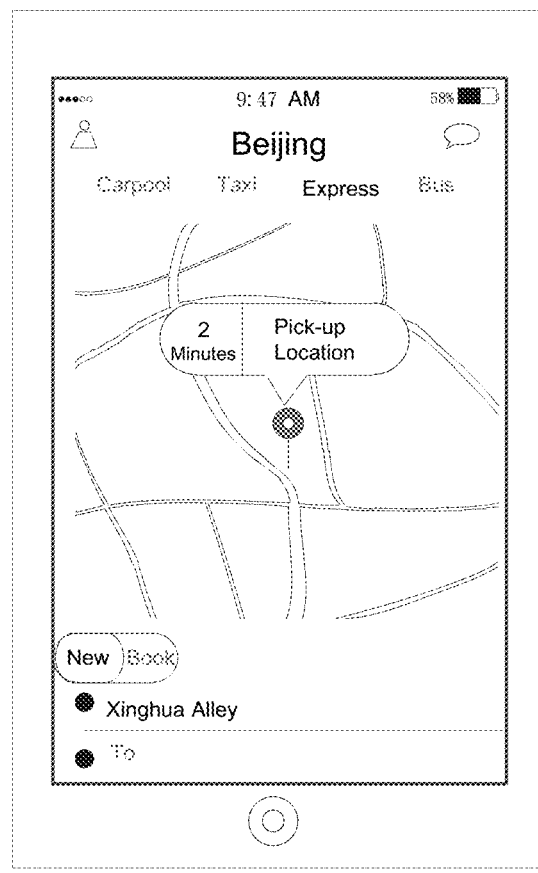
FIG. 5 is an exemplary user interface of an application on a user terminal according to some embodiments of the present disclosure.

FIG. 5 is an exemplary user interface of an application on a user terminal according to some embodiments of the present disclosure. As illustrated in FIG. 5, the application may be an application of a car hailing service. In the application, there may be a plurality of service types, such as a carpooling service, a taxi service, an express service, a bus service, or the like, or any combination thereof. In some embodiments, when a user uses the application on the user terminal 120, the server 110 may obtain positioning information of the user terminal 120. In response to receiving a service request for a certain service type from the user terminal 120, the server 110 may determine a response time of the corresponding service type based on the positioning information of the user terminal 120. The server 110 may further push a bubble message carrying the response time to the user terminal 120. In some embodiments, the user terminal 120 may mark a current location of the user or the user terminal 120 on a map displayed on the user interface corresponding to the service type, and remind the user of the response time of such service type through the bubble message at the marked current location of the user or the user terminal 120. The response time may be a time of a vehicle of such service type to arrive at a user's start location, which may also be called as a pick-up time. For example, the bubble message may be "2 Minutes to get on a car here". FIG. 5 is an exemplary user interface illustrating the bubble message when the user selects the express service.

In some embodiments, when the server 110 determines that the service type of vehicles are in short supply in an area within a predetermined distance from the user's start location or the user's current location, the server 110 may push a bubble message including "no available vehicles nearby" to the user terminal 120. However, by virtue of the above bubble message, the user may only know that such service type of vehicles are in short supply. The user may not obtain other information facilitating the user's travel, and thereby causing that the user experience is relatively poor.

In consideration of the above problem, systems and methods for presenting a bubble prompting message in the present disclosure are provided for the purpose of solving the problem that the bubble message may not meet the demand for actual use of the user in the prior art.

It should be noted that, the service type involved in the car hailing application in the present disclosure is specifically related to a design of the car hailing application. For example, in some car hailing applications, the service type may include a carpool service, a taxi service, an express service, a bus service, a private car, or the like, or any combination thereof. Each service type may correspond to a user interface. In some car hailing applications, the service types may be determined based on different vehicle types. For example, the service types may include an official car service, a commercial vehicle service having seven seats, a limousine service, or the like, or any combination thereof. The service types including the carpool service, the taxi service, the express service and the bus service illustrated in the car hailing application in the present disclosure, are only illustrated for description and introduction purposes. It should be understood for those have ordinary skills in the art that the systems and methods for presenting the bubble prompting message in the present disclosure is not limited to the application scenario. Any car hailing applications provided with many other service types of vehicles may adopt the bubble prompting message provided by the present disclosure, thereby improving the user experience. It also should be noted that any online to offline service applications may also adopt the bubble prompting message provided by the present disclosure.

Figure 6:
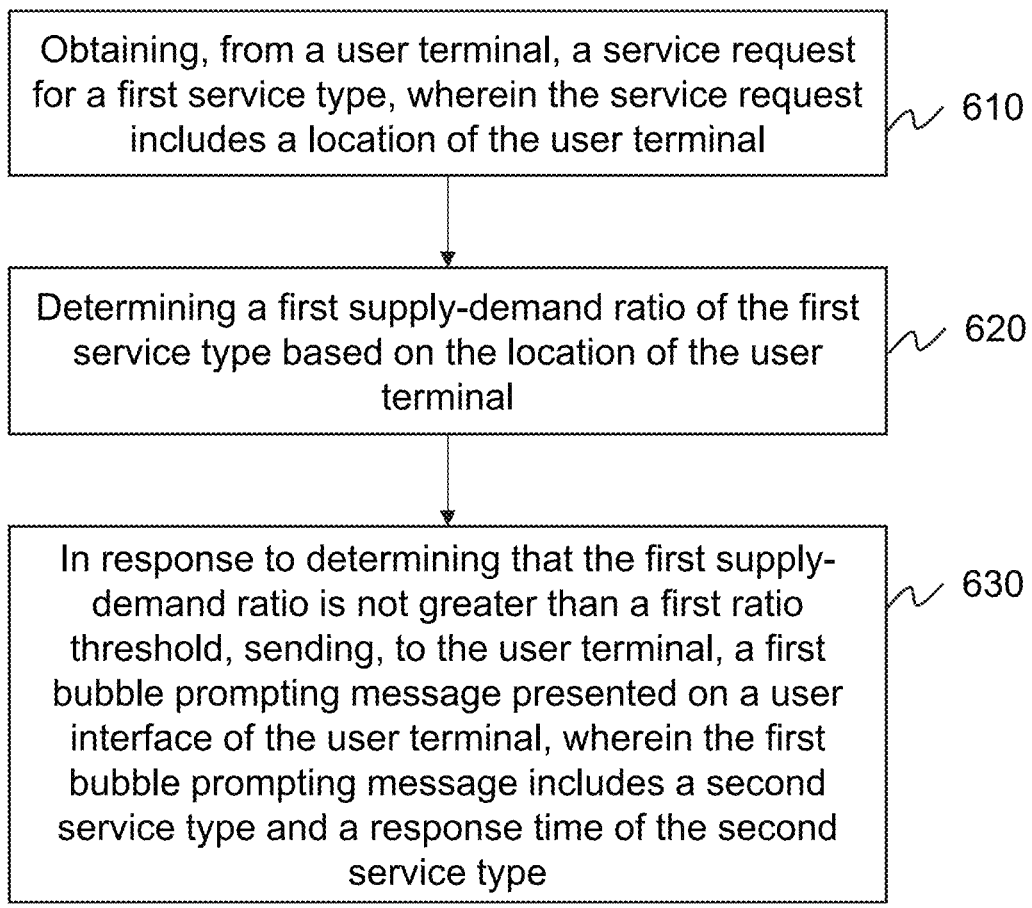
FIG. 6 is a flowchart illustrating an exemplary process for presenting a first bubble prompting message according to some embodiments of the present disclosure.

FIG. 6 is a flowchart illustrating an exemplary process for presenting a first bubble prompting message according to some embodiments of the present disclosure. The process 600 may be executed by the online to offline service system 100, or a server integrating the online to offline service system 100. For example, the process 600 may be implemented as a set of instructions (e.g., an application) stored in the storage ROM 230 or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

The process 600 may include: in response to obtaining a service request for a certain service type from the user terminal 120, the server 110 may push a first bubble prompting message including other service types to the user terminal 120 when a supply-demand ratio of the certain service type is not greater than a predetermined ratio threshold.

In 610, the server 110 (e.g., the processor 220, the receiving module 411) may obtain, from the user terminal 120, a service request for a first service type. In some embodiments, the service request includes a location of the user terminal, a start location, a destination, a request time, a start time, a service type, or the like, or any combination thereof. In some embodiments, the service request may be an intention for traveling using the first service type.

In some embodiments, when the user selects the first service type on the user interface of the car hailing application (the user has not sent a travel order), the user terminal 120 may send the service request for the first service type to the server 110, which indicates the server 110 that there is a demand for the first service type of the user terminal 120. The server 110 may obtain the service request for the first service type from the user terminal 120.

In some embodiments, the user terminal 120 may send the service request for the first service type to the server 110 through a service request message. The user terminal 120 may also send the service request for the first service type to the server 110 through any existing ways.

In some embodiments, the user terminal 120 may also send the service request for the first service type to the server 110 through other existing messages. For example, in the car hailing application, each service type may correspond to a user interface. Therefore, the user terminal 120 may send a network request for requesting data of the user interface corresponding to the first service type to a network equipment, to implicitly indicate the service request for the first service type of the user terminal 120 to the network equipment through the network request.

Figure 7:
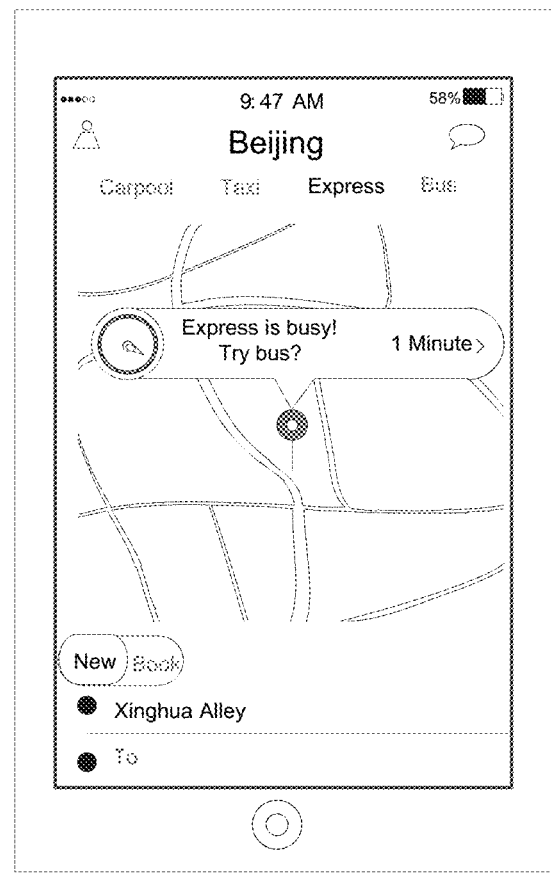
FIG. 7 is an exemplary user interface of an application on a user terminal according to some embodiments of the present disclosure.

FIG. 7 is an exemplary user interface of an application on a user terminal according to some embodiments of the present disclosure. As shown in FIG. 7, when the user selects the express (i.e., the first service type) on the user interface of the car hailing application, the user terminal 120 may send the network request for requesting the data of the user interface corresponding to the express to the network equipment, to implicitly indicate the service request for the first service type of the user terminal 120 to the network equipment through the network request.

In 620, the server 110 (e.g., the processor 220, the determining module 412) may determine a first supply-demand ratio of the first service type based on the location of the user terminal. In some embodiments, the server 110 may determine a first supply-demand ratio of the first service type based on the start location.

In some embodiments, the server 110 may obtain the location of the user terminal 120 or the user from the user terminal 120. The server 110 may determine the first supply-demand ratio of the first service type in an area within a predetermined distance from the location of the user terminal 120 (or the start location of the user). In some embodiments, the first supply-demand ratio may be a ratio of a count of available vehicles (or available service providers) to a count of user terminals (or service requesters requesting for the target service type) in the area. In some embodiments, the area may include a circular area, a square area, a hexagon area, etc., which is centered on the location of the user terminal 120 (or the start location of the user). The predetermined distance may be determined according to a configuration of the server, which is not defined in the present disclosure.

For example, the server 110 may determine an area based on the location of the user terminal or the user (or the start location of the user), a predetermined area shape, and a predetermined area size. The server 110 may calculate a count of available vehicles of the first service type that may provide services within the determined area, and a count of user terminals that expect to use the first service type within the determined area. The server 110 may calculate a ratio of the two calculated counts as the first supply-demand ratio of the first service type in the area of the user terminal 120.

In some embodiments, the way of sending the location of the user terminal 120 or the user (or the start location of the user) from the user terminal 120 to the server 110 may be not limited. For example, the user terminal 120 may send the location (or the start location) in the server request as illustrated in 610 to the server 110. As another example, the user terminal 120 may send the location (or the start location) via a separate message, or any other existing ways, to the server 110.

Referring back to FIG. 7, when the user selects the express (i.e., the first service type) on the user interface of the car hailing application, the server 110 may obtain the service request for the express service. The server 110 may obtain the location of the user terminal or the user (or the start location of the user). The server 110 may then calculate a count of available vehicles of the first service type that may provide services within the determined area, and a count of user terminals that expect to use the first service type within the determined area. The server 110 may calculate a ratio of the two calculated counts as the first supply-demand ratio of the first service type in the area of the user terminal 120.

In 630, in response to determining that the first supply-demand ratio is not greater than a first ratio threshold, the server 110 (e.g., the processor 220, the pushing module 413) may send, to the user terminal 120, a first bubble prompting message presented on the user interface of the user terminal 120. In some embodiments, the first bubble prompting message may include response information of a second service type. The response information of the second service type may include a second service type and a response time of the second service type.

In some embodiments, the first ratio threshold may be used for measuring whether the first service type is in short supply. In some embodiments, the server 110 may determine whether the first supply-demand ratio is greater than the first ratio threshold. For example, the server 110 may compare the first supply-demand ratio and the first ratio threshold. In some embodiments, the first ratio threshold may be determined by the server 110 or a user thereof. For example, the first ratio threshold may be a preset value determined by the server 110 or the user thereof. As another example, the first ratio threshold may be determined according to different application scenarios, such as different cities, different districts, different areas, different time, or the like, or any combination thereof.

When the first supply-demand ratio of the first service type is not greater than the first ratio threshold, it indicates that the first service type is in short supply within the area of the user terminal 120. In such scenario, the server 110 may send the response information of the second service type in the first bubble prompting message to the user terminal 120. The user terminal 120 may display the first bubble prompting message on the user interface thereof. In some embodiments, the response information of the second service type may include a second service type and a response time of the second service type. In some embodiments, a second supply-demand ratio of the second service type is greater than the first supply-demand ratio of the first service type within the area of the user terminal 120. For example, the second supply-demand ratio of the second service type is the greatest among supply-demand ratios of a plurality of service types within the area of the user terminal 120.

By this way, the user may obtain the response information of a vehicle that has the greatest supply-demand ratio currently via the first bubble prompting message when the first service type is in short supply. The user may decide whether to continue to select the first service type or select a service type having greater supply-demand ratio than the first service type based on the first bubble prompting message to improve the user's travel efficiency and improve the user experience. In addition, the server 110 may guide the users to select other service types when the supply-demand ratio of the selected service type is in short supply to reduce a churn rate of the users.

Referring back to FIG. 7, when the user selects the express (i.e., the first service type) on the user interface of the car hailing application, the server 110 may determine whether the first supply-demand ratio of the express is greater than the preset threshold after obtaining the first supply-demand ratio of the express within the area of the user terminal 120 according to the location of the user terminal 120 (or the start location of the user). In some embodiments, the preset threshold may be determined by the server 110 or a user thereof. For example, the present threshold may be a preset value determined by the server 110 or the user thereof. As another example, the preset threshold may be determined according to different application scenarios, such as different cities, different districts, different areas, different time, or the like, or any combination thereof.

When the first supply-demand ratio of the express is not greater than the first ratio threshold, it indicates that the express is in short supply within the area of the user terminal 120. The server 110 may determine a vehicle (i.e., the second service type) that having the greatest supply-demand ratio within the area of the user terminal 120. For example, a vehicle of the second service type may be a bus. The server 110 may push the first bubble prompting message including the response information of the bus to the user terminal 120. The user terminal 120 may display the first bubble prompting message on a corresponding user interface of the express. For example, the first bubble prompting message may include "Express is busy! Try Bus? 1 Minute". The first bubble prompting message indicates that the second service type is the bus service, and the response time of the second service type is 1 minute. A bus of the bus service may take 1 minute to arrive at the location of the user terminal or the user (or the start location of the user).

By this way, the user may rapidly obtain the response information of the bus service that has the greatest supply-demand ratio currently via the first bubble prompting message when the express service is in short supply. The user may decide whether to continue to select the express service or select bus service based on the first bubble prompting message to improve the user's travel efficiency and improve the user experience. In addition, the server 110 may guide the users to select other service types when the supply-demand ratio of the selected service type is in short supply to reduce a churn rate of the users.

In some embodiments, the first bubble prompting message may further include a link to a user interface displaying the second service type. After the server 110 sends the first bubble prompting message to the user terminal 120, the user terminal 120 may display the link to the user interface corresponding to the second service type on the user interface corresponding to the first service type while displaying the response information of the second service type in a format of bubble. In this way, after the user acquires the response information of the second service type through the first bubble prompting message, if the user decides to travel with the second service type, he/she may click the link displayed on the first bubble prompting message to rapidly jump from the user interface corresponding to the first service type to the user interface corresponding to the second service type. The user's travel efficiency and the user experience are improved.

Referring back to FIG. 7, for example, the second service type is the bus service. The server 110 may send the first bubble prompting message including the response information of the bus service and the link to the user interface corresponding to the bus to the user terminal 120. For example, the first bubble prompting message may include "Express is busy! Try Bus? 1 Minute>". The symbol ">" may be a visual icon of the link to the user interface of the bus service. In some embodiments, if the user decides to select the bus service, the user may click on the symbol ">" in the first bubble prompting message. The user terminal 120 may rapidly jump to the user interface of the bus service, which further improves the user's travel efficiency and improves the user experience.

In some embodiments, the first bubble prompting message may further include data relating to the first supply-demand ratio of the first service type. The data relating to first supply-demand ratio may indicate the user terminal 120 to generate a view of the first supply-demand ratio of the first service type. After the server 110 sends the first bubble prompting message to the user terminal 120, the user terminal 120 may display the view of the first supply-demand ratio of the first service type and the response information of the second service type on the user interface corresponding to the first service type in the format of bubble. By this way, the user may perceive the first supply-demand ratio of the first service type via the visualized view of the first supply-demand ratio. The user's travel efficiency and the user experience are improved.

In some embodiments, the view of the first supply-demand ratio may include any view that is capable of providing visualization of the first supply-demand ratio. FIG. 7 illustrates a view of the first supply-demand ratio in format of a view similar to an instrument panel. It should be noted that FIG. 7 is only for illustration purpose, the first bubble prompting message may include the response information of the second service type, the link to the user interface corresponding to the second service type, and the view of the first supply-demand ratio of the first service type, or the like, or any combination thereof.

FIG. 8 is a flowchart illustrating an exemplary process for presenting a second bubble prompting message according to some embodiments of the present disclosure. The process 800 may be executed by the online to offline service system 100, or a server integrating the online to offline service system 100. For example, the process 800 may be implemented as a set of instructions (e.g., an application) stored in the storage ROM 230 or RAM 240. The processor 220 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

The process 800 may include: in response to obtaining a first travel order from the user terminal 120, the server 110 may push a second bubble prompting message including a queue-number of the first travel order to the user terminal 120.

In 810, the server 110 (e.g., the processor 220, the receiving module 411) may obtain, from a user terminal 120, a first travel order. In some embodiments, the first travel order may include a target service type, a first sending time of the first travel order, a start location, a destination, a start time, or the like, or any combination thereof.

In some embodiments, when a user of the user terminal 120 sends the first travel order having the start location and the destination via a user interface of a car hailing application, the server 110 may obtain the first travel order.

In 820, the server 110 (e.g., the processor 220, the determining module 412) may determine a queue-number and a waiting time of the first travel order based on the first sending time and at least one second sending time of at least one second travel order in an unallocated order queue of the target service type.

In some embodiments, the at least one second travel order may include a plurality of travel orders sent by a plurality of other user terminals within an area of the user terminal 120. The at least one second travel order may include the same target service type with that of the first travel order.

In some embodiments, after the server 110 obtain the first travel order from the user terminal 120, the server 110 may queue the first travel order and a plurality of unprocessed travel orders (also refers to as the at least one second travel orders) within the area of the user terminal 120 according to a descending order of the sending time thereof. The server 110 may obtain the queue-number of the first travel order. In some embodiments, the unprocessed travel orders may be travel orders to which the server 110 have not allocated vehicles. The users of the unprocessed travel orders have not been allocated to vehicles to pick up the corresponding users.

In some embodiments, the waiting time of the first travel order may be how long the server 110 will take to process the first order. The way of determining the waiting time of the first travel order may be not limited in the present disclosure. For example, the server 110 may determine the waiting time based on an average processing time of a predetermined travel order and the queue-number of the first travel order.

In 830, the server 110 (e.g., the processor 220, the pushing module 413) may send, to the user terminal 120, a second bubble prompting message presented on a user interface of the user terminal 120. In some embodiments, the second bubble prompting message may include the queue-number and the waiting time of the first travel order.

In some embodiments, the user terminal 120 may display the queue-number and the waiting time of the first travel order in a list of a plurality of unprocessed travel orders in a format of bubble. The users may focus on the bubble when using the car hailing application. Therefore, the user may timely acquire a processing state of the travel order of the user via the second bubble prompting message. The user experience is improved.

Figure 9:
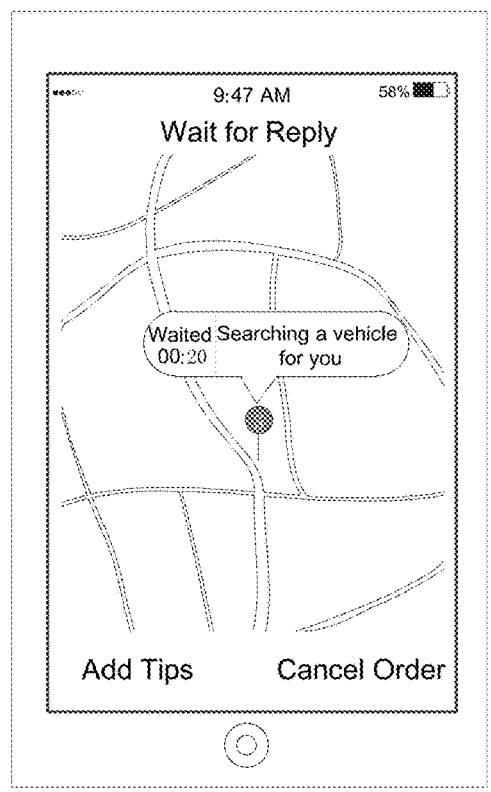
FIG. 9 is an exemplary user interface of an application on a user terminal according to some embodiments of the present disclosure.

FIG. 9 is an exemplary user interface of an application on a user terminal according to some embodiments of the present disclosure. When a user sends a travel order on a user interface of the car hailing application, as shown in FIG. 9, the user terminal 120 may display a state of the travel order and a cumulative time that the travel order may be processed in a format of bubble on the user interface. For example, the bubble prompting message may include "Waited 00:20. Searching a vehicle for you". "Waited 00:20" may be the cumulative time that the travel order may be processed. "Searching a vehicle for you" may be the state of the travel order.

The bubble prompting message illustrated in FIG. 9 may neither provide the user that whether the server 110 has processed his/her travel order, nor the time how long the user has waited. The user experience is poor.

Figure 10:
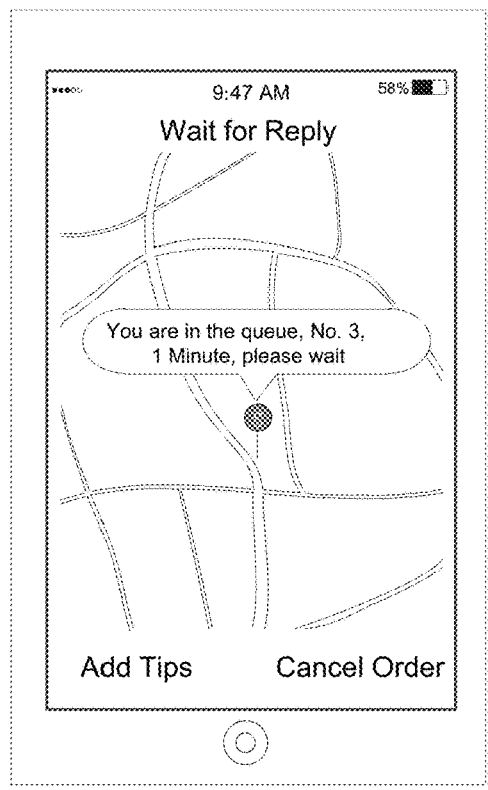
FIG. 10 is an exemplary user interface of an application on a user terminal according to some embodiments of the present disclosure.

FIG. 10 is an exemplary user interface of an application on a user terminal according to some embodiments of the present disclosure. As shown in FIG. 10, after the user terminal 120 sends the first travel order for hailing the express service to the server 110, the server 110 may send the second bubble prompting message including the queue-number and the waiting time of the first travel order to the user terminal 120. In this way, the user terminal 120 may display the queue-number and the waiting time of the first travel order on the user interface in a format of a bubble. For example, the second bubble prompting message may include "You are in the queue, No. 3, 1 Minute, please wait". "No. 3" may be the queue-number of the first travel order in the list of a plurality of unprocessed travel order. "1 Minute" may be the waiting time of the first travel order. In some embodiments, the second bubble prompting message may also include an original bubble message, such as, the state of the first travel order of "You are in the queue" as shown in FIG. 10.

Therefore, the user may timely acquire a processing state of the first travel order of the user via the second bubble prompting message. The user experience is improved.

In some embodiments, the server 110 may set a time threshold. The time threshold may be used for measuring whether the waiting time of the first travel order is too long. In some embodiments, the time threshold may be determined by the server 110 or the user thereof. For example, the time threshold may be a preset value determined by the server 110 or the user thereof. As another example, the time threshold may be determined according to different application scenarios, such as different cities, different districts, different areas, different time, or the like, or any combination thereof. Therefore, the server 110 (e.g., the processor 220, the recording module 414) may record the waiting time of first travel order after receiving the first travel order sent by the user terminal 120. The server 110 may determine whether the waiting time of the first travel order is less than the time threshold. When the waiting time of the first travel order is not less than the time threshold, it may indicate that the available vehicles corresponding to the first travel order are few within the area of the user terminal 120. Therefore the server 110 may fail to allocate a vehicle corresponding to the first travel order to the user terminal 120 for a long time. In some embodiments, the server 110 may regard the vehicle corresponding to the first travel order as the first service type. As shown in FIG. 7, the server 110 may push the first bubble prompting message of the response information of the second service type to the user terminal 120. Correspondingly, the user terminal 120 may display the first bubble prompting message on the user interface after receiving the first bubble prompting message.

Figure 11:
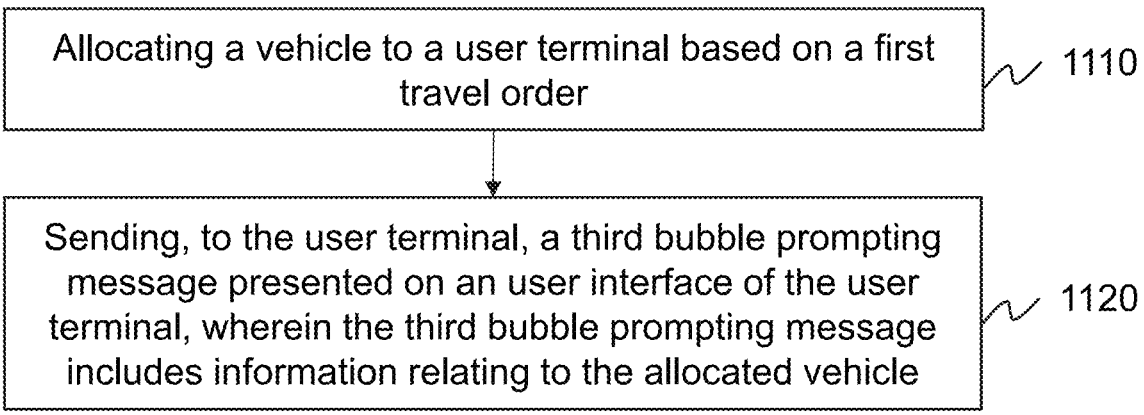
FIG. 11 is a flowchart illustrating an exemplary process for presenting a third bubble prompting message according to some embodiments of the present disclosure.

FIG. 11 is a flowchart illustrating an exemplary process for presenting a third bubble prompting message according to some embodiments of the present disclosure. The process 1100 may be executed by the online to offline service system 100, or a server integrating the online to offline service system 100. For example, the process 1100 may be implemented as a set of instructions (e.g., an application) stored in the storage ROM 230 or RAM 240. The processor 220 may execute the set of instructions, and when executing the instructions, it may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

The process 1100 may include: in response to obtaining a first travel order from the user terminal 120, the server 110 may push a third bubble prompting message including vehicle information corresponding to the first travel order to the user terminal 120.

In 1110, the server 110 (e.g., the processor 220, the allocating module 415) may allocate a vehicle to the user terminal 120 based on the first travel order.

In some embodiments, the server 110 may allocate a vehicle nearest to the user terminal 120, which is able to pick up the user and is the same service type in the first travel order, to the user terminal 120 based on the location of the user terminal 120 (or the start location of the user).

In 1120, the server 110 (e.g., the processor 220, the pushing module 413) may send, to the user terminal 120, a third bubble prompting message presented on an user interface of the user terminal 120. In some embodiments, the third bubble prompting message may include information relating to the allocated vehicle.

In some embodiments, the information relating to the allocated vehicle may include a color of the allocated vehicle, a plate number of the allocated vehicle, a vehicle type of the allocated vehicle, or the like, or any combination thereof. In some embodiments, the information relating to the allocated vehicle may further include a driver name of the allocated vehicle, a phone number of a driver of the allocated vehicle, a waiting time that the allocated vehicle may takes to arrive the location of the user terminal 120 (or the start location of the user), or the like, or any combination thereof.

In some embodiments, the user terminal 120 may display the information relating to the allocated vehicle in a format of a bubble. The users may focus on the bubble when using the car hailing application. Therefore, the user may timely acquire the information relating to the allocated vehicle (also refers to a vehicle that will pick up the user). The user experience is improved.

Figure 12:
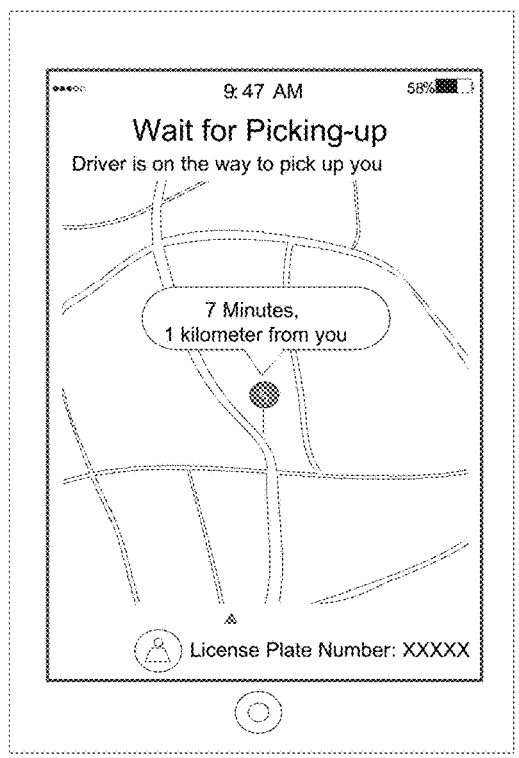
FIG. 12 is an exemplary user interface of an application on a user terminal according to some embodiments of the present disclosure.

FIG. 12 is an exemplary user interface of an application on a user terminal according to some embodiments of the present disclosure. As shown in FIG. 12, after the user terminal 120 sends the first travel order for hailing the express service to the server 110, the server 110 may allocate an express for the user terminal. The user terminal 120 may display partial information of the express at the bottom of the user interface. For example, the user terminal 120 may display the plate number of the express at the bottom of the user interface.

The user may not obtain all information of the express via the user interface illustrated in FIG. 12. When the user needs to learn more about the express, the user has to operate more to obtain more information. The user experience is poor.

Figure 13:
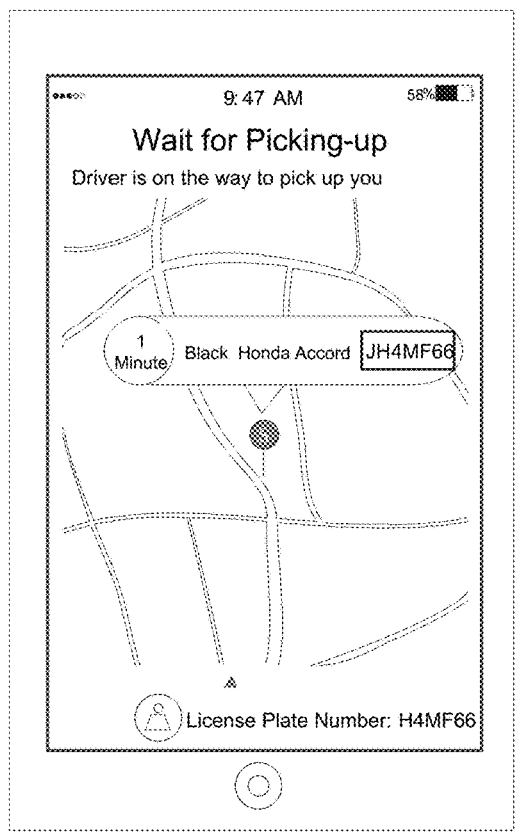
FIG. 13 is an exemplary user interface of an application on a user terminal according to some embodiments of the present disclosure.

FIG. 13 is an exemplary user interface of an application on a user terminal according to some embodiments of the present disclosure. As shown in FIG. 13, after the server 110 allocates an express for the user terminal 120, the server 110 may send the third bubble prompting message including the information relating to the express to the user terminal 120. The user terminal 120 may display the information relating to the express on the user interface in a format of a bubble. For example, the third bubble prompting message may include "Black, Honda Accord, JH4MF66". "Black" may be the color of the express. "Honda Accord" may be the vehicle type of the express. "JH4MF66" may be the plate number of the express. In some embodiments, the third bubble prompting message may also include an original bubble message, such as, the waiting time of the express (also refers to a time the express may take to pick up the user) is "1 Minute" as shown in FIG. 13.

The user may obtain all information of the allocated vehicle via the third bubble prompting message displayed on the user interface of the user terminal 120. The user experience is improved.

Figure 14:
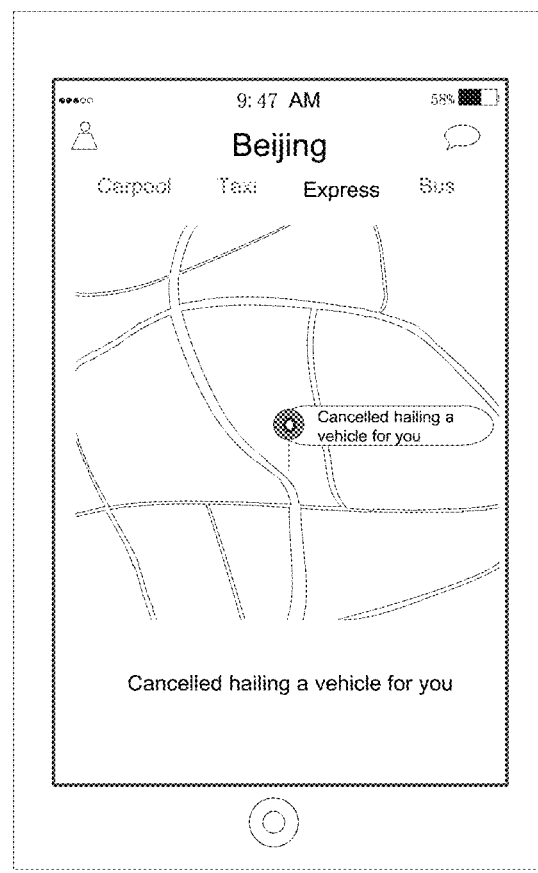
FIG. 14 is an exemplary user interface of an application on a user terminal according to some embodiments of the present disclosure.

FIG. 14 is an exemplary user interface of an application on a user terminal according to some embodiments of the present disclosure. As shown in FIG. 14, there may be a plurality of service types, such as a carpooling service, a taxi service, an express service, a bus service, or the like, or any combination thereof. In some embodiments, the user may trigger a travel order of the express service on a user interface of the express service. In some embodiments, when the vehicles of the express service are insufficient (the express service is in short supply) within an area within a predetermined distance from the location of the user terminal 120 (or the start location of the user), the server 110 may fail to match or allocate an express for the user terminal 120. In some embodiments, the user terminal 120 may display a card message on the user interface of the application. For example, the card message may include "cancelled hailing a vehicle for you". Via the user interface illustrated in FIG. 14, the user may only know that the express service is in short supply within the area, but may not obtain other information facilitating the user travel. The user experience is relatively poor.

FIG. 15 is a flowchart illustrating an exemplary process for presenting a third bubble prompting message according to some embodiments of the present disclosure. The process 1500 may be executed by the online to offline service system 100, or a server integrating the online to offline service system 100. For example, the process 1500 may be implemented as a set of instructions (e.g., an application) stored in the storage ROM 230 or RAM 240. The processor 220 may execute the set of instructions, and when executing the instructions, it may be configured to perform the process 1500. The operations of the illustrated process presented below are intended to be illustrative. In some embodiments, the process 1500 may be accomplished with one or more additional operations not described and/or without one or more of the operations discussed. Additionally, the order in which the operations of the process as illustrated in FIG. 15 and described below is not intended to be limiting.

The process 1500 may include: in response to obtaining a first travel order triggered by a user of a user terminal 120, the server 110 may push a card prompting message including attribute information of a recommended service type to the user terminal 120 when the user terminal 120 fails to be allocated to a vehicle.

In 1510, the server 110 (e.g., the processor 220, the receiving module 422) may obtain, from a user terminal 120, a first travel order. In some embodiments, the first travel order may be triggered by a user on a user interface of an online to offline service application in the user terminal 120. In some embodiments, the first travel order may include a target service type, a first sending time of the first travel order, a start location, a destination, a start time, a location of the user terminal, or the like, or any combination thereof. In some embodiments, the first sending time of the first travel order may be the same as the start time if the start time is default at the time sending the first travel order. In some embodiments, the start location may be same as the location of the user terminal if the start location is default at where the user terminal is located.

In some embodiments, the user may click a car-hailing button on the user interface corresponding to the target service type of the car hailing service application to trigger the first travel order for the target service type. In some embodiments, the user may also trigger the first travel order for the target service type by entering a start location, a destination, a travel time, or the like, or any combination thereof. The user may also adopt a combination of the two ways to trigger the first travel order for the target service type.

In 1520, in response to determining that the first travel order fails to be allocated to a vehicle, the server 110 (e.g., the processor 220, the sending module 421) may send, to the user terminal 120, a card prompting message presented on the user interface of the user terminal 120. In some embodiments, the server 110 (e.g., the processor 220, the displaying module 423) may instruct the user terminal 120 to display the card prompting message on the user interface of the user terminal 120. In some embodiments, the card prompting message may include attribute information of a recommended service type. For example, the attribute information of the recommended service type may include a recommended service type, a logo of the recommended service type (e.g., a name or an image thereof), a response time of the recommended service type, or the like, or any combination thereof. The response time of the recommended service type may be a time that a vehicle of the recommended service type takes to arrive at the start location of the user, which is also refers to as a pick up time.

In some embodiments, the server 110 may determine a second supply-demand ratio of the target service type based on the start location. For example, the server 110 may determine an area of the user terminal 120 within a predetermined distance from the start location. The server 110 may determine the second supply-demand ratio of the target service type within the area. The second supply-demand ratio may be a ratio of a count of available vehicles (or available service providers) to a count of user terminals (or service requesters requesting for the target service type) in the area. The server 110 may determine whether the second supply-demand ratio is greater than a second ratio threshold. If the second supply-demand ratio is not greater than a second ratio threshold, the server 110 may not match a vehicle of the target service type to the user terminal 120. Therefore, the server 110 may determine that the first travel order is failed to be allocated to a vehicle. In some embodiments, the area may include a circular area, a square area, a hexagon area, etc., which is centered on the location of the user terminal 120 (or the start location of the user). The predetermined distance may be determined according to a configuration of the server, which is not defined in the present disclosure. In some embodiments, the second ratio threshold may be determined by the server 110 or a user thereof. For example, the second ratio threshold may be a preset value determined by the server 110 or the user thereof. As another example, the second ratio threshold may be determined according to different application scenarios, such as different cities, different districts, different areas, different time, or the like, or any combination thereof. In some embodiments, the second ratio threshold may be same as the first ratio threshold. Alternatively, the second ratio threshold may be different form the first ratio threshold.

In some embodiments, if the server 110 obtains a cancel request for the first travel order from the user terminal 120, the server 110 may determine that the first travel order fails to be allocated to a vehicle. In some embodiments, the cancel request may be triggered by the user on the user interface of the car hailing application. In some embodiments, the cancel request may be a cancel request triggered by the user before the server 110 allocates a vehicle of the target service type to the user terminal 120 (i.e., no vehicle of the target service type obtains the first travel order). In some embodiments, the cancel request may be a cancel request triggered by the user after the server 110 allocates a vehicle of the target service type to the user terminal 120, but before the corresponding vehicle picks up the user of the user terminal 120 (i.e., before the user gets on the vehicle).

In some embodiments, the response time of the recommended service type may be less than the response time of the target service type. For example, an available vehicle of the recommended service type (or available service provider of the recommended service type) may pick up the user of the user terminal faster than that of the target service type. In some embodiments, a third supply-demand ratio of the recommended service type may be greater than the second supply-demand ratio of the target service type. For example, there may be more available vehicles of the recommended service type (or available service providers of the recommended service type) in the area than that of the target service type. In some embodiments, an estimated fee of the recommended service type may be less than an estimated fee of the target service type. For example, using the recommended service type, the user may cost less than using the target service type.

Figure 16:
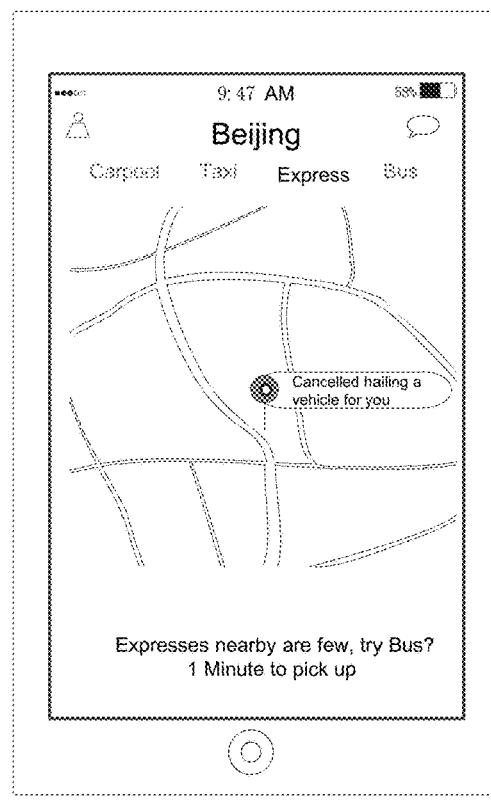
FIG. 16 is an exemplary user interface of an application on a user terminal according to some embodiments of the present disclosure.

FIG. 16 is an exemplary user interface of an application on a user terminal according to some embodiments of the present disclosure. As shown in FIG. 16, after the user triggers a first travel order for an express service on the user interface of the car-hailing application of the user terminal 120, if the first travel order fails to be allocated to an express, the user terminal 120 may display a card prompting message including the attribute information of the recommended service type on the user interface. For example, the recommended service type is bus service, the displayed card prompting message may include "Expresses nearby are few, try Bus? 1 Minute to pick up". "Bus" may be a logo of the recommended service type. "1 Minute" may be a response time of the recommended service type.

For example, a user A may trigger a first travel order for an express service on a user interface of the express service. The server 110 may determine a second supply-demand of the express service in an area of the user terminal. If the second supply-demand is not greater than the second ratio threshold, the server 110 may determine that available vehicles of the express service in the area are insufficient. The server 110 may fail to allocate an express to the user A. The user terminal of the user A may display a card prompting message including "Expresses nearby are few, try Bus? 1 Minute to pick up". The card prompting message may guide the user A to select the bus service (also refers to as the recommended service type). The purpose is to guide users to select other types of service to reduce a churn rate of the users.

As another example, a user B may trigger a first travel order for an express service on a user interface of the express service. The user B may initiatively cancel the first travel order due to waiting for a long time for being allocated to an express (i.e., a matching time of an express is long) or planning to select other travel modes. The user terminal of the user B may display a card prompting message including "Expresses nearby are few, try Bus? 1 Minute to pick up". The card prompting message may guide the user B to select the bus service (also refers to as the recommended service type). The purpose is to guide users to select other types of service to reduce a churn rate of the users.

The card prompting message may intuitively and rapidly provide the attribution information of the recommended service type to users. The purpose is to guide users to select other types of service to reduce a churn rate of the users. Correspondingly, the user may also rapidly decide whether to select other service types based on the attribute information of other service types. The travel efficiency of the user and the user experience are improved.

In some embodiments, the card prompting message may include an option that triggers a recommended travel order for the recommended service type. In some embodiments, the option that triggers the recommended travel order for the recommended service type may include an operation button for triggering the recommended service type, a link to a user interface of the recommended service type, a link for triggering the recommended service type, or the like, or any combination thereof. In this way, after the user obtains the attribute information of the recommended service type through the card prompting message, if the user decides to travel with the recommended service type, he/she may rapidly trigger the recommended travel order for the recommended service type by clicking the option displayed on the card prompting message. The travel efficiency of the user and the user experience are improved.

In some embodiments, the card prompting message may include an estimated fee of the recommended travel order for the recommended service type, a fee difference between an estimated fee of the recommended travel order for the recommended service type and the estimated fee of the first travel order for the target service type, or the like, or any combination thereof. In this way, the card prompting message may intuitively and rapidly provide the estimated fee of the recommended service type to users. The user may also obtain the fee difference between the two service types. The user may determine whether to select the recommended service type based on the fee difference and the estimated fee of the recommended service type. The travel efficiency of the user and the user experience are improved.

Figure 17:
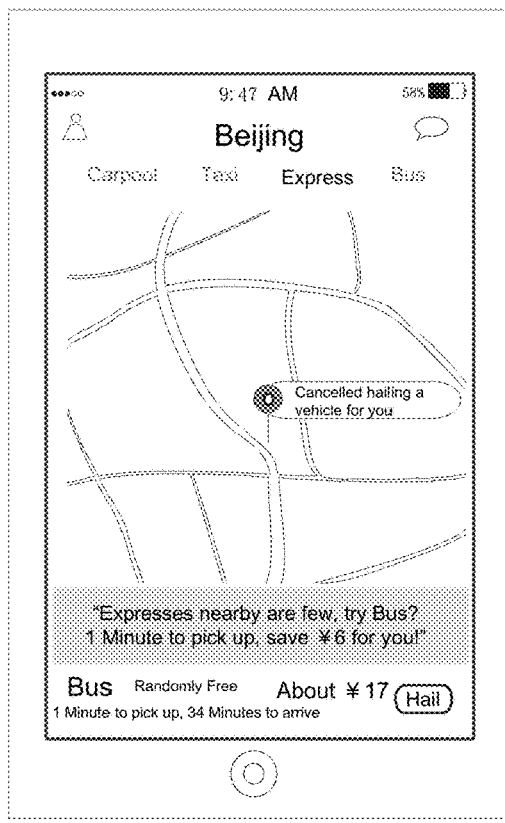
FIG. 17 is an exemplary user interface of an application on a user terminal according to some embodiments of the present disclosure.

In some embodiments, the card prompting message may include the recommended service type, the response time of the recommended service type, the option that triggers the recommended travel order for the recommended service type, the estimated fee of the recommended travel order for the recommended service type, the fee difference between an estimated fee of the recommended travel order for the recommended service type and the estimated fee of the first travel order for the target service type, or the like, or any combination thereof. FIG. 17 is an exemplary user interface of an application on a user terminal according to some embodiments of the present disclosure. As shown in FIG. 17, the card prompting message may include attribute information of the recommended service type, the operation button for triggering the recommended service type, the estimated fee of the recommended travel order for the recommended service type, and the fee difference between the estimated fee of the recommended travel order for the recommended service type and the estimated fee of the first travel order for the target service type.

As shown in FIG. 17, "Bus" may be a logo of the recommended service type. "1 Minute" may be a response time of the recommended service type. The button of "Hail" may be an option button for triggering the recommended service type. "Save ¥6 for you" may be the fee difference between the recommended travel order for the recommended service type and the estimated fee of the target service type. "About ¥17" may be the estimated fee of the recommended service type.

In some embodiments, to enable users to rapidly obtain effective information, the card prompting message may include two areas. The first area may include operational advertising prompting message, for example, "Expresses nearby are few, try Bus? 1 Minute to pick up, save ¥6 for you". In some embodiments, the operational advertising prompting message in the first area may be highlighted, so that the user may rapidly capture the prompting message. The second area may include detailed information of the recommended service type. For example, the second area may include attribution of the second service type, the operation button for triggering the recommended service type and the estimated fee of the recommended travel order for the recommended service type. The detailed information in the second area may intuitively and rapidly provide the relating information of the recommend service type. The travel efficiency of the user and the user experience are improved.

In some embodiments, the card prompting message may further include a total estimated time that a vehicle of the recommended service type may take to arrive at the destination, an advertisement of the recommended service type, or the like, or any combination thereof. As shown in FIG. 17, the card prompting message may include "34 Minutes to arrive" and "Randomly Free". The users may obtain comprehensive relating information of the recommended service type.

It should be noted that FIG. 17 is only for illustration purpose. For example, the layout, the distribution and the representation of all contents in the card prompting message shown in FIG. 17 are only schematic, and not limited in the present disclosure. For example, the card may be displayed on the user interface by flying out from the bottom to the top, or may be displayed on the user interface in the forms, such as flaying out from left to right, flying out from right to left, flying out from the top to the bottom, rotary flying out. The present disclosure neither defines the position that the above card prompting message is displayed on the user interface.

In some embodiments, the process for presenting the card prompting message including attribute information of the recommended service type may be described from the user terminal 120. Alternatively, the process may be described from the server 110.

Figure 18:
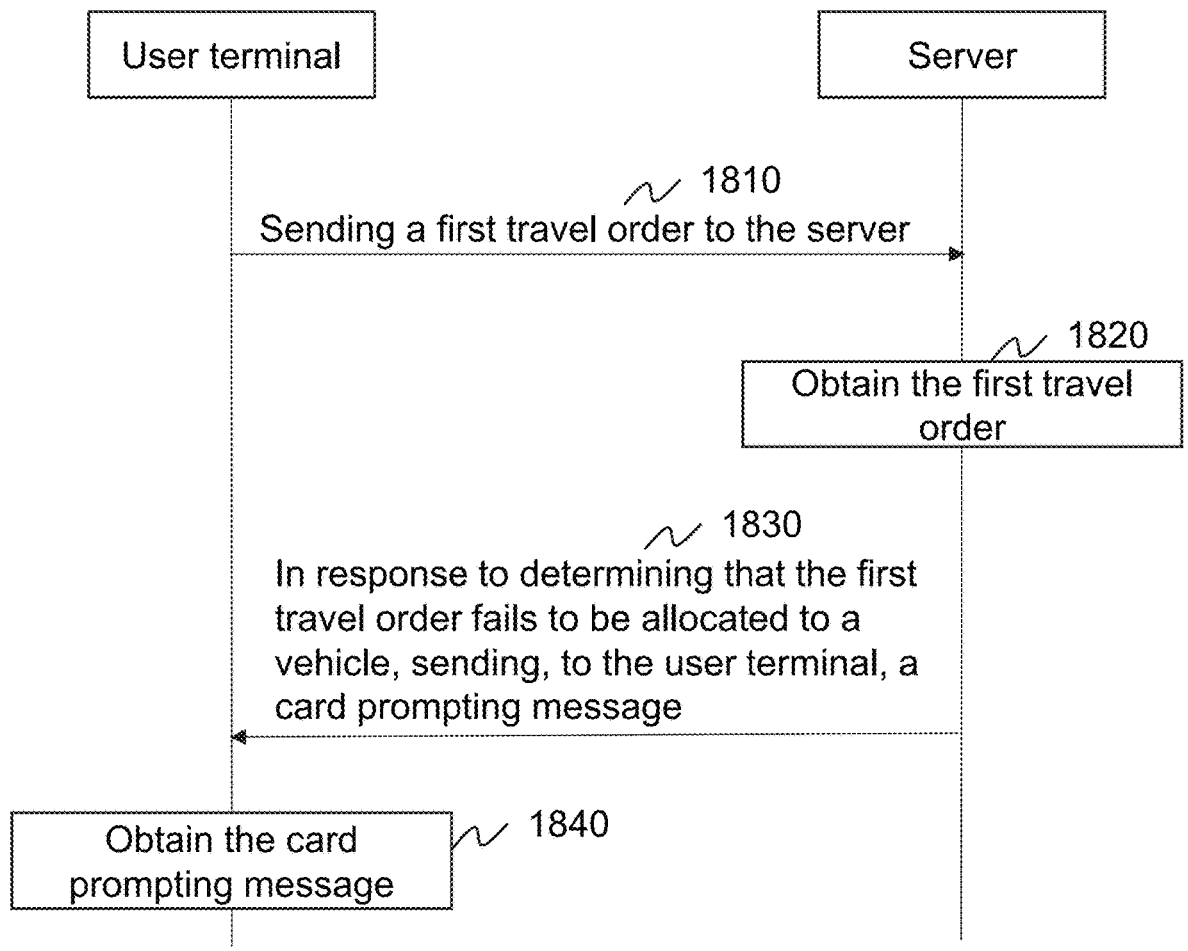
FIG. 18 is a flowchart illustrating instructions for presenting a card prompting message on a user terminal according to some embodiments of the present disclosure.

FIG. 18 is a flowchart illustrating instructions for presenting a card prompting message on a user terminal according to some embodiments of the present disclosure. As shown in FIG. 18, the instructions may include after the user terminal 120 sends the first travel order to the server 110. In response to the situation that the server fails to allocate a vehicle of the target service type to the user terminal 120, the server 110 may push a card prompting message to the user terminal 120.

In 1810, the user terminal 120 may send a first travel order to the server 110. In some embodiments, the first travel order may be used to instruct the server 110 to match a vehicle of a target service type for the user terminal 120. The first travel order may include a logo of the target service type that the user selects, a start location, a start time, a destination, or the like, or any combination thereof.

In 1820, the server 110 may obtain the first travel order.

In 1830, in response to determining that the first travel order fails to be allocated to a vehicle, the server 110 may send, to the user terminal 120, a card prompting message.

In some embodiments, if the user of the user terminal 120 triggers a cancel request for the first travel order on a user interface of the user terminal 120, the server 110 obtains the cancel request for the first travel order from the user terminal 120. The server 110 (e.g., the processor 220, the processing module 424) may determine that the first travel order fails to be allocated to a vehicle.

In some embodiments, the server 110 (e.g., the processor 220, the processing module 424) may determine a second supply-demand ratio of the target service type based on the start location. For example, the server 110 may determine an area of the user terminal 120 within a predetermined distance from the start location. The server 110 may determine the second supply-demand ratio of the target service type within the area. The second supply-demand ratio may be a ratio of a count of available vehicles (or available service providers) to a count of user terminals (or service requesters requesting for the target service type) in the area. The server 110 (e.g., the processor 220, the processing module 424) may determine whether the second supply-demand ratio is greater than a second ratio threshold. If the second supply-demand ratio is not greater than a second ratio threshold, the server 110 may not match a vehicle of the target service type to the user terminal 120. Therefore, the server 110 (e.g., the processor 220, the processing module 424) may determine that the first travel order is failed to be allocated to a vehicle.

In some embodiments, the area may include a circular area, a square area, a hexagon area, etc., which is centered on the location of the user terminal 120 (or the start location of the user). The predetermined distance may be determined according to a configuration of the server, which is not defined in the present disclosure.

In some embodiments, the server 110 (e.g., the processor 220, the processing module 424) may determine the recommended service type based on an operation strategy of the car hailing application. For example, the recommended service type may be an up to date service type that the car hailing application brings out. In some embodiments, the server 110 may determine the recommended service type based on user's behavior data or historical traveling information of the user terminal 120 of the car hailing application. For example, the recommended service type may be a service type that the user of the user terminal 120 most frequently used in the history.

In some embodiments, the historical traveling information may include a historical travel time of the user terminal 120, a historical start information of the user terminal 120, a historical destination of the user terminal 120, a historical target service type, a historical traveling record of the user terminal 120, or the like, or any combination thereof.

In some embodiments, the sever 110 may determine a service type having a greater supply-demand ratio than that of the target service type, and assign the service type as the recommended service type. For example, the target service type is an express service. The sever 110 may determine that the supply-demand ratio of a private car service within an area of the user terminal 120 is greater than that of the express service based on the start location of the user terminal 120. The private car service may be assigned as the recommended service type to be recommended to the user terminal 120.

In some embodiments, the server 110 may determine a service type that the corresponding distance to arrive at the start location is shorter than that of the target service type, and assign the corresponding service type as the recommended service type. In some embodiments, the server 110 may determine a service type that a response time thereof is less than that of the target service type, and assign the corresponding service type as the recommended service type. For example, the target service type is an express service. The server 110 may obtain positioning information of a plurality vehicles of a plurality of service types within the area of the user terminal 120. If the sever 110 determine that there is a private car is closer to the user terminal 120 than a nearest express within the area. The server 110 may assign the private car service as the recommended service type to recommend to the user terminal 120.

In some embodiments, the server 110 may determine a service type that the corresponding estimated fee is the least among a plurality of service types within the area based on the start location, the destination, and the start time. The server 110 may assign the determined service type as the recommended service type. For example, the target service type is an express service. The server 110 determine that the estimated fee of the taxi service in the area is less than that of the express service. The server 110 may assign the taxi service as the recommended service type to recommend to the user terminal 120.

In some embodiments, the server 110 may determine a travel preference of the user. The server 110 may determine a service type based on the travel preference. For example, the target service type is an express service. The server 110 determine that the user may intend to travel with an economic and quick service type, such as a bus service, based on the historical traveling information of the user terminal 120. The server 110 may assign the bus service as the recommended service type to recommend to the user terminal 120.

In 1840, the user terminal 120 may obtain the card prompting message.

The user may obtain attribution information of other service types via the card prompting message displayed on the user interface of the user terminal 120. The purpose is to guide users to select other types of service to reduce a churn rate of the users. In addition, the user may determine whether to select other service types based on the attribution information. The travel efficiency of the user and the user experience are improved.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A system for presenting a prompting message on a user interface of an online to offline service application in a user terminal, the system comprising:
   at least one storage medium including a set of instructions for presenting a prompting message on a user interface of an online to offline service application in a user terminal; and
   at least one processor in communication with the storage medium, wherein when executing the set of instructions, the at least one processor is directed to:
      obtain, from a user terminal, a service request for a first service type, wherein the service request includes a location of the user terminal;
      determine a first supply-demand ratio of the first service type based on the location of the user terminal;
      determine whether the first supply-demand ratio is greater than a first ratio threshold; and
      in response to determining that the first supply-demand ratio is not greater than the first ratio threshold, send, to the user terminal, a first bubble prompting message presented on a user interface of the user terminal, wherein the first bubble prompting message includes a second service type and a response time of the second service type.

2. The system of claim 1, wherein the first bubble prompting message further includes a link to a user interface displaying the second service type, or a view of the first supply-demand ratio of the first service type.

3. The system of claim 1, wherein the second service type has a greatest supply-demand ratio among a plurality of service types associated with the location of the user terminal.

4. The system of claim 1, wherein the at least one processor is further directed to:
   obtain, from the user terminal, a first travel order, wherein the first travel order includes a target service type and a first sending time of the first travel order;

obtain at least one second travel order in an unallocated order queue of the target service type, wherein each second travel order includes a second sending time of the second travel order;

determine a queue-number and a waiting time of the first travel order based on the first sending time and the at least one second sending time; and send, to the user terminal, a second bubble prompting message presented on the user interface of the user terminal, wherein the second bubble prompting message includes the queue-number and the waiting time of the first travel order.

5. The system of claim 4, wherein the at least one processor is further directed to:

determine whether the waiting time of the first travel order is less than a time threshold; and in response to determining that the waiting time of the first travel order is not less than the time threshold, send, to the user terminal, the first bubble prompting message presented on the user interface of the user terminal.

6. The system of claim 4, wherein the at least one processor is further directed to:

allocate a vehicle to the user terminal based on the first travel order; and send, to the user terminal, a third bubble prompting message presented on the user interface of the user terminal, wherein the third bubble prompting message includes information relating to the allocated vehicle.

7. The system of claim 6, wherein the third bubble prompting message includes at least one of: a color of the allocated vehicle, a plate number of the allocated vehicle, or a vehicle type of the allocated vehicle.

8. The system of claim 1, wherein the at least one processor is further directed to:

obtain, from the user terminal, a first travel order, wherein the first travel order includes a target service type and a start location, and is triggered by a user on the user interface of the online to offline service application in the user terminal;

determine that the first travel order fails to be allocated to a vehicle; and send, to the user terminal, a card prompting message presented on the user interface of the user terminal, wherein the card prompting message includes a recommended service type and a response time of the recommended service type.

9. The system of claim 8, wherein the card prompting message further includes at least one of: an option that triggers a recommended travel order for the recommended service type, an estimated fee of the recommended travel order for the recommended service type, or a fee difference between an estimated fee of the recommended travel order for the recommended service type and the estimated fee of the first travel order for the target service type.

10. The system of claim 8, wherein the first travel order includes a start location, and to determine that the first travel order fails to be allocated to a vehicle, the at least one processor is further directed to:

determine a second supply-demand ratio of the target service type based on the start location;

determine whether the second supply-demand ratio is greater than a second ratio threshold; and in response to determining that the second supply-demand ratio is not greater than the second ratio threshold, determine that the first travel order fails to be allocated to a vehicle.

11. The system of claim 8, wherein to determine that the first travel order fails to be allocated to a vehicle, the at least one processor is further directed to:

obtain, from the user terminal, a cancel request for the first travel order; and determine that the first travel order fails to be allocated to a vehicle.

12. The system of claim 8, wherein the first travel order includes at least one of: a start time, a start location, a destination, or historical traveling information of the user terminal.

13. The system of claim 8, wherein the at least one processor is further directed to:

determine the recommended service type that prompted to the user terminal based on the first travel order.

14. A method for presenting a prompting message on a user interface of an online to offline service application in a user terminal, comprising:

obtaining, from a user terminal, a service request for a first service type, wherein the service request includes a location of the user terminal;

determining a first supply-demand ratio of the first service type based on the location of the user terminal;

determining whether the first supply-demand ratio is greater than a first ratio threshold; and in response to determining that the first supply-demand ratio is not greater than the first ratio threshold, sending, to the user terminal, a first bubble prompting message presented on a user interface of the user terminal, wherein the first bubble prompting message includes a second service type and a response time of the second service type.

15. The method of claim 14, wherein the first bubble prompting message further includes a link to a user interface displaying the second service type, or a view of the first supply-demand ratio of the first service type.

16. The method of claim 14, wherein the second service type has a greatest supply-demand ratio among a plurality of service types associated with the location of the user terminal.

17. The method of claim 14, further comprising:

obtaining, from the user terminal, a first travel order, wherein the first travel order includes a target service type and a first sending time of the first travel order;

obtaining at least one second travel order in an unallocated order queue of the target service type, each second travel order includes a second sending time of the second travel order;

determining a queue-number and a waiting time of the first travel order based on the first sending time and the at least one second sending time; and sending, to the user terminal, a second bubble prompting message presented on the user interface of the user terminal, wherein the second bubble prompting message includes the queue-number and the waiting time of the first travel order.

18. The method of claim 17, further comprising:

allocating a vehicle to the user terminal based on the first travel order; and sending, to the user terminal, a third bubble prompting message presented on the user interface of the user terminal, wherein the third bubble prompting message includes information relating to the allocated vehicle.

19. The method of claim 14, further comprising:

obtaining, from the user terminal, a first travel order, wherein the first travel order includes a target service type and a start location, and is triggered by a user on the user interface of the online to offline service application in the user terminal;

determining that the first travel order fails to be allocated to a vehicle; and sending, to the user terminal, a card prompting message presented on the user interface of the user terminal, wherein the card prompting message includes a recommended service type and a response time of the recommended service type.

20. A non-transitory computer readable medium, comprising at least one set of instructions for presenting a prompting message on a user interface of an online to offline service application in a user terminal, wherein when executed by at least one processor of a computer device, the at least one set of instructions directs the at least one processor to:

obtain, from a user terminal, a service request for a first service type, wherein the service request includes a location of the user terminal;

determine a first supply-demand ratio of the first service type based on the location of the user terminal;

determine whether the first supply-demand ratio is greater than a first ratio threshold; and in response to determining that the first supply-demand ratio is not greater than the first ratio threshold, send, to the user terminal, a first bubble prompting message presented on a user interface of the user terminal, wherein the first bubble prompting message includes a second service type and a response time of the second service type.

* * * * *